(12) United States Patent
Inumaru et al.

(10) Patent No.: US 8,814,335 B2
(45) Date of Patent: Aug. 26, 2014

(54) INKJET RECORDING METHOD AND INK SET FOR INKJET RECORDING

(75) Inventors: Masaki Inumaru, Kanagawa (JP); Eiichi Miyata, Kanagawa (JP); Yoshiki Nozaka, legal representative, Kanagawa (JP); Takao Otomaru, Tokyo (JP); Yukio Sugita, Kanagawa (JP); Mitsuyoshi Tamura, Kanagawa (JP); Fumie Yamazaki, Kanagawa (JP); Naoki Shiraishi, Kanagawa (JP)

(73) Assignee: DNP Fine Chemicals Co., Ltd., Kanagawa (JP)

( * ) Notice: Subject to any disclaimer, the term of this patent is extended or adjusted under 35 U.S.C. 154(b) by 0 days.

(21) Appl. No.: 14/007,771

(22) PCT Filed: Mar. 27, 2012

(86) PCT No.: PCT/JP2012/002107
§ 371 (c)(1),
(2), (4) Date: Sep. 26, 2013

(87) PCT Pub. No.: WO2012/132403
PCT Pub. Date: Oct. 4, 2012

(65) Prior Publication Data
US 2014/0132661 A1    May 15, 2014

(30) Foreign Application Priority Data
Mar. 29, 2011   (JP) .................................. 2011-072384

(51) Int. Cl.
*B41J 2/01* (2006.01)
*B41J 2/21* (2006.01)
*C09D 11/00* (2014.01)

(52) U.S. Cl.
CPC .............. *B41J 2/2114* (2013.01); *B41J 2/2107* (2013.01); *C09D 11/54* (2013.01)
USPC ............................................. 347/96; 347/100

(58) Field of Classification Search
CPC ....... C09D 11/30; C09D 11/322; C09D 11/54
USPC ................ 347/21, 28, 95–100; 523/160, 161; 106/31.13, 31.6
See application file for complete search history.

(56) References Cited

U.S. PATENT DOCUMENTS

| | | | |
|---|---|---|---|
| 2005/0140763 A1* | 6/2005 | Jackson | 347/100 |
| 2006/0170746 A1* | 8/2006 | Jackson | 347/100 |
| 2009/0231405 A1 | 9/2009 | Fukui | |
| 2009/0274855 A1* | 11/2009 | Koenig et al. | 428/32.21 |
| 2010/0040782 A1* | 2/2010 | Arai et al. | 427/256 |
| 2011/0292116 A1* | 12/2011 | Sago et al. | 347/21 |

FOREIGN PATENT DOCUMENTS

| | | |
|---|---|---|
| JP | 09-207424 A | 8/1997 |
| JP | 11-034478 A | 2/1999 |

(Continued)

*Primary Examiner* — Matthew Luu
*Assistant Examiner* — Rut Patel
(74) *Attorney, Agent, or Firm* — Kubotera & Associates, LLC

(57) ABSTRACT

An inkjet recording method characterized by adhering a receiving solution (A) to at least areas on a recording medium (R) which are to be printed with an inkjet ink (I) or the whole surface of the medium (R) which is to be printed, said receiving solution (A) being a solution obtained by dissolving (inclusive of dispersing) one or more metal salts (S) selected from among at least divalent, calcium salts, magnesium salts, nickel salts, aluminum salts, boron salts, and zinc salts and one or more resins (B) having hydrophilic groups in an aqueous solvent in such amounts that the concentrations of the metal salts (S) and the resins (B) fall within the range of 0.005 to 2.0 mol/l and within the range of 0.5 to 20 mass % respectively, and then applying the inkjet ink (1) to areas where the metal salts are present in an adhered state to carry out printing. Said inkjet ink (I) is an ink which has a pigment (P), an anionic resin emulsion (E), and an aqueous solvent, and in which phosphorus-containing groups each having at least one P—O or P=O bond are bonded to the surface of the pigment (P) or the surface of the anionic resin emulsion (E).

20 Claims, 5 Drawing Sheets

FOREIGN PATENT DOCUMENTS

| | | |
|---|---|---|
| JP | 2002-019263 A | 1/2002 |
| JP | 2009-513802 A | 4/2009 |
| JP | 2009-515007 A | 4/2009 |
| JP | 2009-178912 A | 8/2009 |
| JP | 2009-214495 A | 9/2009 |
| JP | 2009-240925 A | 10/2009 |
| JP | 2010-005832 A | 1/2010 |
| WO | 2007/053563 A2 | 5/2007 |
| WO | 2007/053564 A2 | 5/2007 |

* cited by examiner

INKJET RECORDING METHOD AND INK SET FOR INKJET RECORDING

TECHNICAL FIELD

The present invention relates to an inkjet recording method for printing on a recording medium to which an ink-receiving solution containing a specific metal salt and a resin has been applied by using an inkjet ink containing a specific pigment or an anionic resin emulsion and to an ink set for inkjet recording.

BACKGROUND ART

Ink jet printing systems have been developed and widely put into practical use in recording medium printing fields. When an inkjet printer is used to print, ink droplets discharged from a print head are landed on a recording medium, penetrated and fixed to form dots, with a lot of these gathering dots, an image is formed. This process of formation of dots is important to form a clear image. Absorbing materials such as uncoated paper, coated paper and cloth, and non-absorbing materials such as polyester resin and vinyl chloride resin are used as the materials of the recording media.

Paper which is an absorbing material used in recording media is a hydrophilic material and by nature, tends to have an affinity to water because many hydroxyl groups of cellulose exist therein, so that it absorbs water to swell. For this, a hydrophobic material (mainly, a neutral sizing agent) preventing bleeding is added during the course of producing paper for the purpose of providing water resistance to paper for recording media. Also, a white inorganic pigment (for example, clay and calcium carbonate) is added to paper for recording media to provide whiteness and transparency. Because the grain size of the pigment is smaller than the irregularities of fibers, surface roughness formed by the fibers remains on the surface of the paper and therefore, printing accuracy is limited if the paper is used as it is for printing. The surface of the paper is coated with a pigment primarily containing kaolin and calcium carbonate having a grain size of about 0.1 to 0.3 μm to be smoothened. However, a binder such as a synthetic latex used to fix this pigment fills clearances between the pigment grains to hydrophobicize the surface.

Heavy calcium carbonate (one obtained by milling and classifying natural lime stone) is usually used for coated paper such as coat paper and art paper, and uncoated paper such as high-quality paper and middle-quality paper.

When uncoated paper which is an absorbing material is used as a recording medium, if inkjet ink is an aqueous ink, a coloring material is not retained on the surface of the paper because the aqueous ink is easily penetrated into paper fibers, posing a problem that paper bleeding (feathering) is easily caused, so that only insufficient density is obtained. When the bleeding becomes marked, there occurs the penetration of ink to the rear side. When coated paper which is an absorbing material is used, on the other hand, ink is scarcely penetrated and a coloring material is scarcely fixed because a coat layer exists on the surface of the paper, whereby color bleeding which is nonuniform color mixing at a boundary area between different colors readily occurs so that a clear image cannot be obtained. When a non-absorbing material is used as a recording medium, ink is scarcely penetrated and a coloring material is scarcely fixed, whereby color bleeding readily occurs so that a clear image cannot be obtained.

Patent Document 1 discloses a color inkjet recording method for printing on a recording medium by using a reaction solution containing a polyvalent metal salt and an ink composition containing a pigment and a resin emulsion for the purpose of preventing color bleeding while suppressing printing feathering and printing unevenness.

Patent Document 2 discloses an inkjet recording method for printing on a recording medium by using a reaction solution containing a polyvalent metal salt or polyallylamine and an ink composition for the purpose of improving fixability to the recording medium to obtain an image having excellent scratch resistance and water resistance. Patent Document 2 teaches that a colorant, self-crosslinking polymer microparticles having the property of forming a core-shell type film consisting of a core layer having an epoxy group and a shell layer having a carboxyl group, inorganic oxide colloid, a water-soluble organic solvent and water are contained in the ink composition in the method.

Patent Document 3 discloses an inkjet recording method which uses an aqueous ink containing a coloring material and an alginic acid to record on an inkjet recording medium containing a polyvalent metal compound in the surface layer of an ink-receiving layer formed on a substrate, in order to provide an inkjet recording method which suppresses bronzing after image recording and is capable of high-quality printing having excellent scratch resistance.

Patent Document 4 discloses a reaction solution for inkjet recording, comprising at least (i) a calcium salt or a magnesium salt, (ii) an amine salt of sulfuric acid or an organic acid and (iii) a liquid medium, wherein the concentration of the calcium ion or magnesium ion of the calcium salt or magnesium salt in the reaction solution is 0.2 to 0.8 mal/1 and the concentration of the ammonium ion of the amine salt of sulfuric acid or an organic acid is 0.3 to 4.5 mal/l, in order to provide a reaction solution for inkjet recording which improves bleeding when printing is made on plain paper by an inkjet recording method, does not cause the penetration of ink to the rear side and is capable of forming a good image having fixability and color developability at the same time.

To improve the fixability to paper of the pigment, a denatured pigment obtained by binding a functional group having a predetermined calcium index to the surface of a pigment is proposed (see, for example, Patent Documents 5 and 6). Here, the calcium index indicates a measure of ability to coordination-bind dissolved calcium ions, that is, ability of the functional group which captures the calcium ions. The larger the calcium index is, the more strongly and more effectively the functional group coordination-binds the calcium ions.

The above Patent Documents 5 and 6 teach that when inkjet ink containing the denatured pigment is printed on printing paper, the denatured pigment interacts or binds with calcium carbonate or other divalent metal salts existing in or on the surface of the paper, with the result that the pigment is easily fixed to the paper.

PRIOR ART DOCUMENTS

Patent Documents

Patent Document 1: Japanese Patent Application Publication No. 09-207424
Patent Document 2: Japanese Patent Application Publication No. 11-034478
Patent Document 3: Japanese Patent Application Publication No. 2009-178912
Patent Document 4: Japanese Patent Application Publication No. 2010-005832
Patent Document 5: Japanese Patent Application Publication No. 2009-513802

Patent Document 6: Japanese Patent Application Publication No. 2009-515007

SUMMARY OF THE INVENTION

Problems to be Solved by the Invention

Patent Documents 1 and 2 disclose an inkjet recording method in which the ink composition containing a pigment is used to print on a position to which the reaction solution containing a polyvalent metal salt has been applied of the recording medium. However, Patent Documents 1 and 2 teach that an inorganic pigment or an organic pigment may be used as the pigment contained in the ink composition which is used in combination with the reaction solution containing a polyvalent metal salt without any special restrictions. Since there are various types of pigments, the fixability of ink may not be improved according to the type of a pigment.

Patent Document 3 discloses an inkjet recording method for recording on the inkjet recording medium containing a polyvalent metal compound in the surface layer of the ink-receiving layer formed on the substrate by using the aqueous ink containing a coloring material and an alginic acid. Although Patent Document 3 teaches that various dyes and pigments may be used as the coloring material, there are various types of coloring materials and the relationship between the selection of the coloring material and fixability is not disclosed.

Patent Document 4 discloses a reaction solution for inkjet recording, comprising (i) a calcium salt or a magnesium salt, (ii) an amine salt of sulfuric acid or an organic acid, and (iii) a liquid medium. Patent Document 4 teaches that examples of the color pigment ink include, but are not limited to, carbon black and color pigments such as a yellow pigment, a magenta pigment and a cyan pigment. However, it is assumed that there is a reaction solution which does not improve pigment fixability according to the type of a pigment.

Although the inkjet inks disclosed by Patent Documents 5 and 6 are aimed to improve fixability by using calcium carbonate contained in a paper agent, when coated paper such as coat paper and art paper and uncoated paper such as high-quality paper and middle-quality paper are printed by using the inkjet inks, it is preferable that a more clear image should be able to be printed by attaining the suppression of the feathering and color bleeding of an image.

It is an object of the present invention which was made in the view of the above situation to provide an inkjet ink recording method capable of obtaining a clear image by suppressing feathering and color bleeding even when an absorbing material or a non-absorbing material is used as a recording medium as well as an ink set for inkjet recording.

Means for Solving the Problem

In view of the above problems of the prior art, the inventors of the present invention found that a clear image can be obtained by significantly suppressing feathering and color bleeding by applying an ink-receiving solution containing a specific metal salt such as a calcium salt or a magnesium salt and a resin having at least one hydrophilic group and/or a specific resin emulsion to a recording medium and printing on the applied part by using an inkjet ink which contains a pigment, an aqueous solvent. The inkjet ink contains a pigment, an anionic resin emulsion and a surfactant. In the inkjet ink, a phosphorus-containing group is contained in at least one of the pigment and the anionic resin emulsion. The present invention was accomplished based on this finding. That is, the present invention includes the following inventions (1) to (20).

(1) An inkjet recording method, comprising the steps of:
applying an ink-receiving solution (A) prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.005 to 2.0 mol/l and the concentration of the resin (B) becomes 0.5 to 20 mass % to at least a part to be printed by using an inkjet ink (I) or the entire printing surface of a recording medium (R); and
printing on the part to which the ink-receiving solution (A) has been applied by using the inkjet ink (I) comprising at least a pigment (P), an anionic resin emulsion (E), a surfactant and an aqueous solvent, wherein a phosphorus-containing group having at least one P—O or P=O bond is bound to the surface of the pigment (P) and/or the surface of the anionic resin emulsion (E).

(2) An inkjet recording method, comprising the steps of
applying an ink-receiving solution (A) prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.05 to 2.0 mol/l and the concentration of the resin (B) becomes 0.5 to 20 mass % to at least a part to be printed by using an inkjet ink (I) or the entire printing surface of a recording medium (R); and
printing on the part to which the ink-receiving solution (A) has been applied by using the inkjet ink (I) comprising at least a pigment (P), an anionic resin emulsion (E), a surfactant and an aqueous solvent, wherein a phosphorus-containing group having at least one P—O or P=O bond is bound to the surface of the pigment (P) and/or the surface of the anionic resin emulsion (E).

(3) The inkjet recording method in the above paragraph (1), wherein the metal salt (S) is at least one selected from inorganic metal salts (S1) and organic acid metal salts (S2), both the inorganic metal salts (S1) and the organic acid metal salts (S2) include calcium, magnesium, nickel, aluminum, boron and zinc.

(4) The inkjet recording method in the above paragraph (1), wherein the metal salt (S) is at least one inorganic metal salt (S1) selected from chlorides and nitrates of calcium, magnesium, nickel, aluminum, boron and zinc.

(5) The inkjet recording method in the above paragraph (1), wherein the metal salt (S) is at least one organic acid metal salt (S2) selected from calcium salts, magnesium salts, nickel salt and zinc salts of pantothenic acid, propionic acid, ascorbic acid, acetic acid and lactic acid.

(6) The inkjet recording method in the above paragraph (1), wherein the water solubility of the metal salt (S) is 0.1 mol/l or more.

(7) The inkjet recording method in the above paragraph (1), wherein the hydrophilic group of the resin (B1) is at least one selected from hydroxyl group, carboxyl group, carbonyl group, ester group and amino group.

(8) The inkjet recording method in the above paragraph (1), wherein the resin (B1) is at least one selected from polypeptide, gelatin, polyvinyl alcohol-based resin, polyvinyl pyrrolidone-based resin, cellulose-based resin, poly(meth)

acrylic acid, poly(meth)acrylic acid ester, rhodine-based resin, maleic acid resin and urea resin.

(9) The inkjet recording method in the above paragraph (1), wherein the amount of the ink-receiving solution (A) applied to the recording medium (R) is 20 to 2000 µmol/cm$^2$ in terms of the metal salt (S).

(10) The inkjet recording method in the above paragraph (1), wherein the ink-receiving solution (A) is applied to the recording medium (R) by at least one method selected from spray, coating, inkjet, gravure and flexographic methods.

(11) The inkjet recording method in the above paragraph (1), wherein the surface of the recording medium (R) is made of an absorbing material (R1) or a non-absorbing material (R2).

(12) The inkjet recording method in the above paragraph (11), wherein the absorbing material (R1) is groundwood paper, middle-quality paper, high-quality paper, uncoated paper, coat paper, cloth or art paper.

(13) The inkjet recording method in the above paragraph (11), wherein the non-absorbing material (R2) is a polyester-based resin, polypropylene-based synthetic paper, vinyl chloride resin, polyimide resin, metal or metal foil coat paper.

(14) The inkjet recording method in the above paragraph (1), wherein the phosphorus-containing group is at least one selected from phosphonic acid group, phosphinic acid group, phosphinous acid group, phosphite group, phosphate group, diphosphate group, triphosphate group, pyrophosphate group, and partial esters and salts thereof.

(15) The inkjet recording method in the above paragraph (1), wherein the phosphorus-containing group has a larger calcium index than the calcium index of 1,2,3-benzenetricarboxylic acid.

(16) The inkjet recording method in the above paragraph (1), wherein the conductance of an aqueous solution containing 1 mass % of a solid content of the anionic resin emulsion (E) is 300 µS/cm or less.

(17) The inkjet recording method in the above paragraph (1), wherein the average particle diameter of the anionic resin emulsion (E) is 500 nm or less.

(18) The inkjet recording method in the above paragraph (1), wherein the inkjet ink (I) contains 0.05 to 20 mass % of the anionic resin emulsion (E) as a solid content.

(19) The inkjet recording method in the above paragraph (1), wherein the inkjet ink (I) contains 0.05 to 20 mass % of the pigment (P) and 0.05 to 20 mass % of the anionic resin emulsion (E) as a solid content, and has a total solid content of the pigment (P) and the anionic resin emulsion (E) of 0.1 to 30 mass-%.

(20) An ink set for inkjet recording including an ink-receiving solution (A) and an inkjet ink (I), wherein the ink-receiving solution (A) is prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.005 to 2.0 mol/l and the concentration of the resin (B) becomes 0.5 to 20 mass %, and the inkjet ink (I) contains at least a pigment (P), an anionic resin emulsion (E), a surfactant and an aqueous solvent, wherein a phosphorus-containing group having at least one P—O or P=O bond is bound to the surface of the pigment (P) and/or the surface of the anionic resin emulsion (E).

Effect of the Invention (i) In the inkjet recording method in the above paragraphs (1) and (2), since the metal salt (S) and the resin (B) contained in the ink-receiving solution (A) of the present invention are adhered to at least a part to be printed by using the inkjet ink (I) or the entire printing surface of the recording medium (R), the phosphorus-containing group bound to the surface of the pigment (P) or the surface of the anionic resin emulsion (E) contained in the ink acts on the metal salt (S) contained in the ink-receiving solution (A) to greatly improve fixability to the recording medium, thereby significantly suppressing feathering and color bleeding so that a clear image can be obtained.

(ii) In the inkjet recording method in the above paragraph (3), when the metal salt (S) is at least one selected from inorganic metal salts (S1) and organic acid metal salts (S2), both the inorganic metal salts (S1) and the organic acid metal salts (S2) include calcium, magnesium, nickel, aluminum, boron and zinc, the phosphorus-containing group acts on the metal salt (S) to further improve fixability, thereby making it possible to obtain a clear image.

(iii) In the inkjet recording method in the above paragraph (4), when the metal salt (S) is at least one inorganic metal salt (S1) selected from chlorides and nitrates of calcium, magnesium, nickel, aluminum, boron and zinc, the phosphorus-containing group acts on the inorganic metal salt (S1) to further improve fixability, thereby making it possible to obtain a clear image having little bleeding.

(iv) In the inkjet recording method in the above paragraph (5), when the metal salt (S) is at least one organic acid metal salt (S2) selected from calcium salts, magnesium salts, nickel salt and zinc salts of pantothenic acid, propionic acid, ascorbic acid, acetic acid and lactic acid, the phosphorus-containing group acts on the organic acid metal salt (S2) to further improve fixability, thereby making it possible to obtain a clear image.

(v) In the inkjet recording method in the above paragraph (6), when the water solubility of the metal salt (S) is 0.1 mol/l or more, the metal salt can be easily adhered to the recording medium (R), thereby further improving the fixability to the recording medium (R) of the pigment (P).

(vi) In the inkjet recording method in the above paragraph (7), when the hydrophilic group of the resin (B1) is at least one selected from hydroxyl group, carboxyl group, carbonyl group, ester group and amino group, the resin (B) exhibits the function of uniformly dispersing the metal salt (S) to further improve the fixability of an image, thereby significantly suppressing feathering and color bleeding so that a clear image having little bleeding can be obtained.

(vii) In the inkjet recording method in the above paragraph (8), when the resin (B1) is at least one selected from polypeptide, gelatin, polyvinyl alcohol-based resin, polyvinyl pyrrolidone-based resin, cellulose-based resin, poly(meth) acrylic acid, poly(meth)acrylic acid ester, rhodine-based resin, maleic acid resin and urea resin, the resin (B1) exhibits the function of uniformly dispersing the metal salt (S) to further improve the fixability of an image, thereby significantly suppressing feathering and color bleeding so that a clear image having little bleeding can be obtained.

(viii) In the inkjet recording method in the above paragraph (9), when the amount of the ink-receiving solution (A) applied to the recording medium (R) is 20 to 2000 µmol/cm$^2$ in terms of the metal salt (S), the metal salt (S) is adhered to the recording medium (R) in a suitable amount, thereby further improving the fixability to the recording medium (R) of the pigment (P).

(ix) In the inkjet recording method in the above paragraph (10), when the ink-receiving solution (A) is applied to the recording medium (R) by at least one method selected from spray, coating, inkjet, gravure and flexographic methods, it is easy to apply the ink-receiving solution (A) to a part to be printed with the pigment (P) of the recording medium (R) in advance.

(x) In the inkjet recording method in the above paragraph (11), even when the surface of the recording medium (R) is made of an absorbing material (R1) or a non-absorbing material (R2), the fixability of an image is improved, thereby suppressing feathering and color bleeding so that a clear image having little bleeding can be obtained.

(xi) In the inkjet recording method in the above paragraph (12), when groundwood paper, middle-quality paper, high-quality paper, uncoated paper or cloth is used as the absorbing material (R1), feathering can be significantly suppressed and when coated paper such as coat paper or art paper is used as the absorbing material (R1), color bleeding can be significantly suppressed.

(xii) In the inkjet recording method in the above paragraph (13), even when a polyester-based resin, polypropylene-based synthetic paper, vinyl chloride resin, polyimide resin, metal or metal foil coat paper is used as the non-absorbing material (R2), color bleeding can be significantly suppressed.

(xiii) In the inkjet recording method in the above paragraph (14), when the phosphorus-containing group is at least one selected from phosphonic acid group, phosphinic acid group, phosphinous acid group, phosphite group, phosphate group, diphosphate group, triphosphate group, pyrophosphate group, and partial esters and salts thereof, reactivity between the phosphorus-containing group and the metal salt (S) is improved, thereby improving the fixability to the recording medium (R) of the pigment (P) so that a clear image having little bleeding can be obtained.

(xiv) In the inkjet recording method in the above paragraph (15), when the phosphorus-containing group has a larger calcium index than the calcium index of 1,2,3-benzenetricarboxylic acid, the feathering and color bleeding of the pigment (P) are further suppressed, thereby improving fixability to the recording medium (R) so that a clear image having little bleeding can be obtained.

(xv) In the inkjet recording method in the above paragraph (16), when the conductance of an aqueous solution containing 1 mass % of a solid content of the anionic resin emulsion (E) is 300 µS/cm or less, the influence on the dispersion stability of the surface-treated pigment (P) of ionic impurities is reduced, thereby making it possible to achieve excellent storage stability with the result that a more clear image having little bleeding can be obtained.

(xvi) In the inkjet recording method in the above paragraph (17), when the average particle diameter of the anionic resin emulsion (E) contained in the ink (I) is 500 nm or less, the scratch resistance of an image is improved.

(xvii) In the inkjet recording method in the above paragraph (18), when the inkjet ink (I) contains 0.05 to 20 mass % of the anionic resin emulsion (E) as a solid content, the fixability to the recording medium (R) of the pigment (P) is improved.

(xviii) In the inkjet recording method in the above paragraph (19), when the inkjet ink (I) contains 0.05 to 20 mass of the pigment (P) as a solid content and 0.05 to 20 mass % of the anionic resin emulsion (E) as a solid content, and has a total solid content of the pigment (P) and the anionic resin emulsion (E) of 0.1 to 30 mass %, an image having high resolution and little feathering and color bleeding can be obtained.

(xix) The ink set for inkjet recording in the above paragraph (20), significantly suppresses feathering and color bleeding for the same reason as that described in "inkjet recording method" of the above paragraph (i), thereby making it possible to obtain a clear image having little bleeding.

BEST MODE FOR CARRYING OUT THE INVENTION

Figure 1:
FIG. 1 shows a photograph for explaining the evaluation of bleeding in Example 1.

The inkjet ink recording method of the present invention will be explained in the following sections: (I) recording medium (R), (II) ink-receiving solution (A) and its application method, (III) inkjet ink (I) and (IV) inkjet ink recording method. (V) The ink set for inkjet recording of the present invention will be explained as well.

The inkjet recording method of the present invention comprises the steps of:

applying an ink-receiving solution (A) prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (32) in an aqueous solvent to ensure that the concentration of the metal salt (S) becomes 0.005 to 2.0 mol/l and the concentration of the resin (B) becomes 0.5 to 20 mass to at least a part to be printed by using an inkjet ink (I) or the entire printing surface of a recording medium (R); and printing on the part to which the ink-receiving solution (A) has been applied by using the inkjet ink (I) comprising at least a pigment (P), an anionic resin emulsion (E), a surfactant and an aqueous solvent, wherein a phosphorus-containing group having at least one P—O or P═O bond is bound to the surface of the pigment (P) and/or the surface of the anionic resin emulsion (E).

(I) Recording Medium (R)

In the inkjet recording method of the present invention, the recording medium (R) to be printed by using the inkjet ink (I) is not particularly limited, and an absorbing material such as coated paper, uncoated paper or cloth and a non-absorbing material comprising a synthetic resin may be used. Examples of the absorbing material (R1) include uncoated paper such as groundwood paper, middle-quality paper and high-quality paper, coated paper such as coat paper and art paper, cotton, nylon fabrics, silk, hemp, cloth, unwoven cloth and leather. Examples of the non-absorbing material (R2) include, but are not limited to, polyester-based resin, polypropylene-based synthetic paper, vinyl chloride resin, polyimide resin, metals, metal foil coat paper, glass, synthetic rubbers and natural rubbers.

To obtain the effect of suppressing feathering and color bleeding markedly, uncoated paper such as high-quality paper and recycled paper, and coated paper such as coat paper and art paper are preferably used. When uncoated paper such as high-quality paper or recycled paper is used as a recording medium (R), feathering can be significantly suppressed and when coated paper such as coat paper or art paper, or a non-absorbing material is used, color bleeding can be significantly suppressed.

The inkjet recording method of the present invention is characterized in that printing is carried out on a recording medium (R) by using an inkjet ink (I) to form an image. According to the present invention, since the above inkjet ink (I) is used to print on a part to which an ink-receiving solution (A) containing a metal salt (S) and a resin (B) has been applied, a clear image having little bleeding can be obtained by suppressing feathering and color bleeding regardless of the type of a recording medium (R).

(II) Ink-Receiving Solution (A) and Application Method Thereof

The ink-receiving solution (A) of the present invention is prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.005 to 2.0 mol/l and the concentration of the resin (B) becomes 0.5 to 20 mass %.

(1) Metal Salt (S)

The metal salt (S) which can be used herein is at least one selected from calcium salts, magnesium salts, nickel salts, aluminum salts, boron salts and zinc salts all of which are composed of a specific polyvalent metal ion having a valence of 2 or more and an anion bonded to the polyvalent metal ion.

The water solubility of the metal salt (S) is preferably 0.1 mol/l or more. When the water solubility of the metal salt (S) is 0.1 mol/l or more, a reaction between the metal ion and the phosphorus-containing group bound to the surface of the pigment (P) or the surface of the anionic resin emulsion (E) proceeds, thereby further improving the fixability of the pigment (P). Both inorganic salts and organic acid salts listed below may be used as the metal salt (S).

(i) Inorganic Metal Salt (S1)

Examples of the inorganic metal salt (S1) include, but are not limited to, calcium salts and the magnesium salts such as calcium chloride, magnesium chloride, calcium bromide, magnesium bromide, calcium nitrate, magnesium nitrate and magnesium sulfate. Out of these inorganic metal salts, chlorides and nitrates all of which generally have high water solubility are preferred. Further, out of these inorganic metal salts, calcium chloride and magnesium chloride are more preferred and calcium chloride is particularly preferred from the viewpoints of water solubility and reactivity with the phosphorus-containing group.

(ii) Organic Acid Metal Salt (S2)

Examples of the organic acid metal salt (S2) include, but are not limited to, calcium salts, magnesium salts, nickel salts and zinc salts of pantothenic acid, propionic acid, ascorbic acid, acetic acid and lactic acid. Out of these organic acid metal salts, calcium salts of pantothenic acid, propionic acid and acetic acid are preferred because they suppress feathering and color bleeding.

(2) Resin (B)

The resin (B) comprises a resin having at least one hydrophilic group (B1) and/or a cationic or nonionic resin emulsion (B2). The resin (B) suppresses the formation of a solid formed by the metal salt (S) having deliquescent properties such as calcium chloride and exhibits the function of improving the adhesion of the metal salt (S) having low adhesion to a non-absorbing material.

The hydrophilic group of the resin (B1) is preferably at least one selected from hydroxyl group, carboxyl group, carbonyl group, ester group and amino group. Examples of the resin (B1) include, but are not limited to, at least one selected from resins having a skeleton such as polypeptide, gelatin, polyvinyl alcohol-based resin, polyvinyl pyrrolidone-based resin, cellulose-based resin, neutralized product of poly (meth)acrylic acid, poly(meth)acrylic acid ester, rhodine-based resin, maleic acid resin, styrene resin, polyester resin, polyethylene resin, urethane resin, silicone resin, acrylamide resin, epoxy resin and urea resin, and resin emulsions, and further a cationic or nonionic resin emulsion (B2).

The resin (B) is preferably gelatin, polyvinyl pyrrolidone-based resin or a neutralized product of poly(meth)acrylic acid from a practical point of view. The molecular weight of the resin which depends on the type of the resin is about 20,000 to 30,000 in the case of gelatin.

(3) Solvent

Preferably, the solvent used in the ink-receiving solution (A) is an aqueous solvent, is penetrated into the recording medium (R) when the ink-receiving solution (A) is applied to the surface of the recording medium (R) after it is formed by dissolving (inclusive of dispersing) the metal salt (S) to a concentration of 0.005 to 2.0 mol/l and the resin (B) to a concentration of 0.5 to 20 mass and capable of forming a state that the metal salt (S) and the resin (B) are adhered to the surface of the recording medium (R).

The aqueous solvent in the present invention is water or a water-soluble organic solvent. Examples of the water-soluble organic solvent includes alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; monohydric alcohols such as 3-methoxy-3-methyl-1-butanol, 3-methoxy-1-propanol, 1-methoxy-2-propanol and 3-methoxy-n-butanol; amides such as dimethylformamide, dimethylacetamide, 3-methoxypropanamide, 3-butoxypropanamide, N,N-dimethyl-3-methoxypropanamide, N,N-dibutyl-3-methoxypropanamide, N,N-dibutyl-3-butoxypropanamide and N,N-dimethyl-3-butoxypropanamide; ketones and ketoalcohols such as acetone and diacetone alcohol; ethers such as tetrahydrofuran and dioxane; oxyethylene and oxypropylene copolymers such as polyethylene glycol and polypropylene glycol; diols such as ethylene glycol, propylene glycol, diethylene glycol, dipropylene glycol, 1,3-propanediol, isopropylene glycol, isobutylene glycol, triethylene glycol, tripropylene glycol, tetraethylene glycol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol and 3-methyl-1,5-pentanediol; trials such as glycerin, trimethylolethane, trimethylolpropane and 1,2,6-hexanetriol; tetrahydric alcohols such as mesoerythritol and pentaerythritol; monoalkyl ethers such as ethylene glycol monomethyl (or ethyl, isopropyl, n-butyl, isobutyl, n-hexyl or 2-ethylhexyl)ether, diethylene glycol monomethyl (or ethyl, isopropyl, n-butyl, isobutyl, n-hexyl or 2-ethylhexyl)ether, triethylene glycol monomethyl (or ethyl, isopropyl, n-butyl or isobutyl)ether, propylene glycol monomethyl (or ethyl, isopropyl, n-butyl or isobutyl) ether and dipropylene glycol monomethyl (or ethyl, isopropyl, n-butyl or isobutyl)ether; dialkyl ethers of a polyhydric alcohol such as diethylene glycol dimethyl ether, diethylene glycol diethyl ether, diethylene glycol ethyl methyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether and dipropylene glycol diethyl ether; alkanolamines such as monoethanolamine, diethanolamine, triethanolamine, N-methylethanolamine, N-ethylethanolamine, N-butylethanolamine, N-methyldiethanolamine, N-ethyldiethanolamine and N-butyldiethanolamine; nitrogen-containing heterocyclic compounds such as N-methyl-2-pyrrolidone, 2-pyrrolidone and 1,3-dimethyl-2-imidazolidinone; and cyclic compounds such as γ-butyrolactone and sulfolane. Water and these water-soluble organic solvents may be used either singly or in combinations thereof.

When the ink-receiving solution (A) is applied by using an ink jet system, a high-boiling organic solvent such as ethylene glycol, diethylene glycol, triethylene glycol, polyethylene glycol, propylene glycol, dipropylene glycol, tripropylene glycol, 1,3-propanediol, glycerin or polypropylene glycol triethanolamine may be preferably used. When a paper substrate is used as the recording medium (R), use of a combination of water and a water-soluble organic solvent can suppress curling and cockling.

(4) Composition of Ink-Receiving Solution (A)

The concentration of the above metal salt (S) in the ink-receiving solution (A) is 0.005 to 2.0 mol/l. When the concentration of the metal salt (S) is not lower than the lower limit value of the above range, the effect of suppressing feathering and color bleeding tends to be exhibited while even when the concentration of the metal salt (S) is higher than the upper limit value of the above range, the further improvement of the effect cannot be expected but new problems may arise such as the production of a deposit and an increase in viscosity. From this point of view, the concentration of the above metal salt (S) is preferably 0.05 to 2.0 mol/l.

When the concentration of the metal salt (S) falls within the above range, if the ink-receiving solution and the inkjet ink (I) are easily absorbed by the recording medium and hardly remain on the surface like an absorbing material (R1), the effect of suppressing feathering and color bleeding tends to be exhibited.

The concentration of the resin (B) in the ink-receiving solution (A) is 0.5 to 20 mass %. When the concentration of the resin (B) is 0.5 mass % or more, the effect of improving the dispersion of the metal salt (S) uniformly into the recording medium (R) which is made of an absorbing material (R1) or a non-absorbing material (R2) and the adhesion of the metal salt (S) to the recording medium (R) is exhibited. Even when the concentration of the resin (B) exceeds the above range, the further improvement of the effect cannot be expected and a new problem such as an increase in viscosity may arise. To exhibit the effect of the present invention, the amount of the metal salt (S) adhered to the recording medium (R) is preferably 20 to 2000 μmol/cm². When the amount of the metal salt (S) adhered is 20 μmol/cm² or more, the effect of suppressing the feathering and color bleeding of the pigment (P) of the present invention is exhibited.

(5) Method of Applying Ink-Receiving Solution (A) to Recording Medium (R)

The method of applying the ink-receiving solution (A) to at least a part to be printed by using the inkjet ink (I) or the entire printing surface of the recording medium (R) is not particularly limited but preferably at least one selected from spray, coating, inkjet, gravure and flexographic methods from a practical point of view. By employing the above method to apply the ink-receiving solution (A) to the recording medium (R), the ink-receiving solution (A) is easily applied to a position where the pigment (P) is to be printed of the recording medium (R) in advance. The time of applying the ink-receiving solution (A) to the recording medium (R) is not particularly limited as long as it is before printing is carried out by using the inkjet ink (I). A recording medium (R) to which the above metal salt (S) has been adhered by applying the ink-receiving solution (A) to the recording medium (R) may be acquired to be printed by using the inkjet ink (I) of the present invention, or right after the ink-receiving solution (A) is applied to the recording medium (R), printing may be carried out by using the inkjet ink (I). A great effect is obtained by carrying out printing right after the application.

(III) Inkjet Ink (I)

The inkjet ink (I) of the present invention contains an aqueous solvent. The inkjet ink (I) contains at least a pigment (P), an anionic resin emulsion (E) and a surfactant. It is an inkjet ink in which a phosphorus-containing group having at least one P—O or P=O bond is bound to the surface of the pigment (P) and/or the surface of the anionic resin emulsion (E).

The pigment (P) is added as a pigment dispersion containing the pigment dispersed in a dispersion medium to an aqueous solvent for inkjet inks together with the anionic resin emulsion (E) and the surfactant.

No particular limitation is imposed on the content of the pigment in the pigment dispersion as long as a sufficient image density is obtained. It is preferably adjusted to be 0.05 to 20 mass % as the concentration of the pigment in the whole inkjet ink (I). In this case, water, a water-soluble organic solvent and a mixture thereof may be used as the dispersion medium.

(1) Pigment Dispersion

If inkjet inks (I) are classified by the coloring material to be used, they are classified into a dye ink and a pigment ink. The pigment ink is superior to the dye ink in image preserving characteristics such as light resistance, water resistance and gas resistance and the utilization of the pigment ink for inkjet recording is under progress. A pigment ink comprising the pigment (P) is used as a coloring material in the present invention. The pigment (P) exists as particles in the inkjet ink (I) and basically develops a color through a crystal structure.

As a method of dispersing the pigment (P) in the inkjet ink (I), there are two types, that is, a resin dispersion type and a self dispersion type. The resin dispersion type is a method in which a pigment is dispersed by a polymer dispersant (surfactant). The polymer dispersant can more stably disperse a pigment than a low-molecular weight surfactant because a steric repulsion effect works besides electrostatic repulsion among particles caused by charge. The self dispersion type is one which disperses by directly modifying the surface of the pigment with a hydrophilic group, and this can be done by surface modification in which at least one functional group selected from a carbonyl group, carboxyl group, hydroxyl group and sulfonic acid group or salt thereof is bound as the hydrophilic group.

The average primary particle diameter (D50) of the pigment (P) may be designed to be, for example, in a range of 5 nm to 200 nm and preferably in a range of 30 nm to 150 nm. This is because irregular reflection of pigment particles in a print image portion can be prevented and also, a print image having a uniform density can be provided when the particle diameter of the pigment is designed to be the above specified particle diameter. When the average primary particle diameter of the pigment (P) exceeds 200 nm, irregular reflection of pigment particles in a print image portion is caused, bringing about deteriorated image chroma and uneven density. The average primary particle diameter of the pigment (P) in the present invention is a value measured at 23° C. under 55% RH by a grain size analyzer (manufactured by Nikkiso Co., Ltd., model: Microtrack UPA). As the pigment (P), an organic pigment may be used. Also, carbon black which is an inorganic pigment may be used. As the color of the pigment (P), any of blue, black, brown, cyan, green, white, violet, magenta, red, orange and yellow may be adopted. A mixture of pigments having different colors may also be used.

The pigment (P) used in the present invention is not particularly limited, and examples thereof include pigments which are used in conventional inkjet inks, such as inorganic pigments including barium sulfate, iron oxide, zinc oxide, barium carbonate, barium sulfate, silica, clay, talc, titanium oxide, calcium carbonate, synthetic mica and alumina, and organic pigments. They may be used either singly or in combinations of two or more. Examples of the organic pigments include insoluble organic solid solution pigments such as insoluble azo pigments, soluble azo pigments, dye derivatives, phthalocyanine-based organic pigments, quinacridone-based organic pigments, perylene-based organic pigments, dioxazine-based organic pigments, nickel azo-based pigments, isoindolinone-based organic pigments, pyranthrone-based organic pigments, thioindigo-based organic pigments, condensation azo-based organic pigments, benzimidazolone-based organic pigments, quinophthalone-based organic pigments, isoindoline-based organic pigments, quinacridone-based solid solution pigments and perylene-based solid solution pigments, and other pigments such as carbon black.

When these organic pigments are represented by color index (C.I.) numbers, they are C.I. Pigment Yellow 1, 2, 3, 12, 13, 14, 16, 17, 20, 24, 73, 74, 75, 83, 93, 95, 97, 98, 109, 110, 114, 117, 120, 125, 128, 129, 130, 137, 138, 139, 147, 148, 150, 151, 153, 154, 155, 166, 168, 180, 185, 213 and 214, C.I. Pigment Red 5, 7, 9, 12, 48, 49, 52, 53, 57, 97, 112, 122, 123, 149, 168, 177, 180, 184, 192, 202, 206, 209, 215, 216, 217, 220, 223, 224, 226, 227, 228, 238, 240 and 254, C.I. Pigment Orange 16, 36, 43, 51, 55, 59, 61, 64 and 71, C.I. Pigment Violet 19, 23, 29, 30, 37, 40 and 50, C.I. Pigment Blue 15, 15:1, 15:3, 15:4, 15:6, 16, 22, 60 and 64, C.I. Pigment Green 7, 36 and 58, and C.I. Pigment Brown 23, 25 and 26.

As mentioned above, in the present invention, the surface of the pigment (P) and/or the surface of the anionic resin emulsion (E) must be modified with a phosphorus-containing group having at least one P—O or P=O bond. A pigment whose surface is modified with a phosphorus-containing group having at least one P—O or P=O bond (P2) and a pigment whose surface is not modified with a phosphorus-containing group (P1) will be described hereinunder.

(i) Pigment Whose Surface is not Modified with a Phosphorus-Containing Group (P1)

The pigment whose surface is not modified with a phosphorus-containing group (P1) is a pigment which is used in ordinary inkjet inks. In the case of the self dispersion type, surface modification in which at least one functional group selected from a carbonyl group, carboxyl group, hydroxyl group and sulfonic acid group having no P—O or P=O bond such as a sulfone group, or salt thereof is bound as a hydrophilic group to the surface of the pigment is carried out.

(ii) Pigment Whose Surface is Modified with a Phosphorus-Containing Group (P2)

As mentioned above, the surface of the pigment (P2) must be modified with a phosphorus-containing group having at least one P—O or P=O bond. A pigment whose surface is modified with another hydrophilic group in addition to the phosphorus-containing group is also included in the pigment (P2) of the Present Invention.

The pigment whose surface is modified with a phosphorus-containing group (P2) used in the present invention is preferably a pigment in which a functional group having a larger calcium index than the calcium index of 1,2,3-benzenetricarboxylic acid is bound to the surface thereof as will be described hereinafter, out of the above surface-treated pigments. In the present invention, when a surface-treated pigment having at least one functional group with a larger calcium index than the calcium index of 1,2,3-benzenetricarboxylic acid bound to the surface of the pigment (P2) is used, bleeding is suppressed, thereby improving fixability to the recording medium (R) so that a more clear image can be printed.

In the present invention, the term "surface-treated pigment" means a pigment having a predetermined functional group bound to the surface thereof, and the term "pigment" means a pigment to the surface of which a predetermined functional group is to be bound.

As for a method of producing the pigment obtained by binding a phosphorus-containing group having at least one P—O or P=O bond to the surface thereof (P2), for example, the method described in Patent Document 5 which discloses examples thereof described in U.S. Pat. No. 5,554,739, U.S. Pat. No. 5,707,432 and U.S. Pat. No. 5,837,045 may be adopted. The form of the pigment may be any of a solid form such as a powder or a paste or a dispersion solution form. For example, the pigment may be prepared in the form of a dispersion solution and may be isolated in the form of solid from the dispersion solution by spray drying. The pigment preferably has the form of a dispersion solution. In this case, this can be a pigment dispersion.

The pigment dispersion may be purified by cleaning including, for example, filtration or centrifugation or a combination of these two methods to remove unreacted raw materials, by-produced salts and other reaction impurities. The product may be isolated, for example, by vaporization or may be recovered by filtration and drying.

(2) Phosphorus-Containing Group

The phosphorus-containing group is at least one selected from phosphonic acid group, phosphinic acid group, phosphinous acid group, phosphite group, phosphate group, diphosphate group, triphosphate group, pyrophosphate group, and partial esters and salts thereof. Among these groups, the phosphorus-containing group preferably contains at least one phosphonic acid group, or partial ester or salt thereof and particularly preferably contains at least two phosphonic acid groups, or partial esters or salts thereof. Here, "partial ester thereof" means that the phosphonic acid group is a partial phosphonate ester group having the formula —PO$_3$RH or salt thereof. Here, R is an aryl, alkaryl, aralkyl or alkyl group.

(2-1) Type of Phosphorus-Containing Group

Examples of the phosphorus-containing group having at least one P—O or P=O bond include the following phosphorus-containing groups (i) to (ix). The phosphorus-containing group of the present invention is not limited to these.

(i) When the phosphorus-containing group contains at least two phosphonic acid groups or salts thereof, one or both of these phosphonic acid groups may be partial phosphonate ester groups. Also, one of these phosphonic acid groups may be a phosphonate ester having the formula —$PO_3R_2$, and the other is any one of a partial phosphonate ester group, phosphonic acid group and salt thereof. Among these groups, at least one of these phosphonic acid groups is preferably a phosphonic acid, partial ester or salt thereof. Here, "salt thereof" means that the phosphonic acid group has a cation counter ion and is partially or completely ionized.

When the functional group contains at least two phosphonic acid groups, one or both of these phosphonic acid groups may be in either a partially ionized form or completely ionized form. Particularly, it is preferable that the functional group should contain at least two phosphonic acid groups and one or both of these phosphonic acid groups should have the formula —$PO_3H_2$, —$PO_3H^-M^+$ (monobasic salt) or —$PO_3^{-2}M^{+2}$ (dibasic salt). Here, $M^+$ is a cation such as $Na^+$, $K^+$, $Li^+$ or $NR_4^+$. R may be the same or different and each represent hydrogen or an organic group (for example, substituted or unsubstituted aryl and/or alkyl group).

(ii) When the phosphorus-containing group contains at least two phosphonic acid groups, examples of the functional group may include groups containing at least one geminal bisphosphonic acid group, partial ester or salt thereof. Specifically, examples of the functional group include groups containing at least two phosphonic acid groups directly bound to the same carbon atom, or partial esters or salts thereof. Such a group is sometimes called 1,1-diphosphonic acid group, or partial ester or salt thereof.

Examples of such a phosphorus-containing group include groups having the formula —$CQ(PO_3H_2)_2$, and groups containing partial esters or salts thereof. Q is bound to the geminal position and represents H, R, OR, SR or $NR_2$ (here, R may be the same or different and each represent H, $C_1$ to $C_{18}$ ($C_1$ to $C_{18}$ means that the number of carbon atoms is 1 to 18, the same shall apply hereinafter) saturated or unsaturated branched or non-branched alkyl group, $C_1$ to $C_{18}$ saturated or unsaturated branched or non-branched acyl group, aralkyl group, alkaryl group or aryl group). Q is, for example, H, R, OR, SR or $NR_2$ (here, R may be the same or different and each represent H or $C_1$ to $C_6$ alkyl group or aryl group), and preferably H, OH or $NH_2$. Moreover, examples of the above functional group include groups having the formula —$(CH_2)_n$ —$CQ(PO_3H_2)_2$, and groups containing partial esters or salts thereof. Here, Q is that mentioned above.

n is 0 to 9, preferably 0 to 3 and even more preferably 0 or 1.

(iii) Examples of the above functional group include groups having the formula —X—$(CH_2)_n$—$CQ(PO_3H_2)_2$, and groups containing partial esters or salts thereof. Here, Q and n are those mentioned above. X represents an arylene group, heteroarylene group, alkylene group, vinylidene group, alkarylene group, aralkylene group, or cyclic or heterocyclic group. X is preferably an arylene group (may be further substituted with one or more optional groups such as alkyl groups or aryl groups) such as a phenylene group, naphthalene group or biphenylene group. When X is an alkylene group, examples of X include substituted or unsubstituted alkylene groups (may be branched or non-branched, or may be substituted with one or more groups (for example, aromatic groups)). Also, examples of X include $C_1$ to $C_{12}$ groups such as a methylene group, ethylene group, propylene group and butylene group. X is preferably bound directly to the pigment. This means that neither other atom nor group exists between the pigment and X.

X may be further substituted with one or more organic groups. Examples of such an organic group include R', OR', COR', COOR', OCOR', carboxylate, halogen, CN, $NR'_2$, $SO_3H$, sulfonate, sulfate, NR'(COR'), $CONR'_2$, imide, $NO_2$, phosphate, phosphonate, N=NR', SOR', NR' $SO_2R'$ and $SO_2NR'_2$. Here, R may be the same or different and each independently represent hydrogen, or branched or non-branched $C_1$ to $C_{20}$ substituted or unsubstituted and saturated or unsaturated hydrocarbon (for example, alkyl, alkenyl, alkinyl, substituted or unsubstituted aryl, substituted or unsubstituted heteroaryl, substituted or unsubstituted alkaryl, or substituted or unsubstituted aralkyl).

(iv) Examples of the above functional group include groups having the formula —X-Sp-$(CH_2)_n$—CQ $(PO_3H_2)$ 2, and groups containing partial esters or salts thereof. Here, X, Q and n are those mentioned above. Sp is a spacer group (connector between two groups). Examples of Sp include binding or connecting groups. Examples of the connecting group include —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR''—, —NR''$CO_2$—, —$O_2CNR''$—, —NR''CONR''—, —N(COR'') CO—, —CON(COR'')—, —NR''COCH($CH_2CO_2R''$)— and its cyclic imide, —NR'' $COCH_2CH(CO_2R'')$— and its cyclic imide, —CH($CH_2CO_2R''$)CONR''— and its cyclic imide, —CH($CO_2R''$)$CH_2CONR''$— and its cyclic imide (including phthalimide and maleimide), sulfonamide group (including —$SO_2NR''$— and —NR''$SO_2$—), arylene group and alkylene group. R'' may be the same or different and each represent hydrogen or an organic group (for example, a substituted or unsubstituted aryl group or alkyl group). As shown by the structure of the above formula, the group containing at least two phosphonic acid groups or salts thereof is bound to X through the spacer group Sp. Sp is preferably —$CO_2$—, —$O_2C$—, —O—, —NR''—, —NR''CO—, or —CONR''—, —$SO_2NR''$—, —$SO_2CH_2CH_2NR''$—, —$SO_2CH_2CH_2O$— or —$SO_2CH_2CH_2S$— (here, R'' is H or a $C_1$ to $C_6$ alkyl group).

(v) Also, when the functional group contains at least two phosphonic acid groups, examples of the functional group may include groups having at least one formula —N—$[(CH_2)_m(PO_3H_2)]_2$, and groups containing partial ester or salt thereof. Here, m may be the same or different, denote 1 to 9, preferably 1 to 3, and more preferably 1 or 2. Also, when the functional group contains at least two phosphonic acid groups, examples of the functional group may include groups having at least one formula —$(CH_2)_n$—N—$[(CH_2)_m(PO_3H_2)]_2$, and groups containing partial ester or salt thereof. Here, n denotes 0 to 9 (for example, 1 to 9), and preferably 0 to 3 (for example, 1 to 3). m is the same as that mentioned above. Also, when the functional group contains at least two phosphonic acid groups, examples of the functional group may include groups having at least one formula —X—$(CH_2)_n$ —N—$[(CH_2)_m(PO_3H_2)]_2$, and groups containing partial ester or salt thereof. Here, X, m and n are the same as those mentioned above. X is preferably an arylene group. Also, when the functional group contains at least two phosphonic acid groups, examples of the functional group may include groups having at least one formula —X-Sp-$(CH_2)_n$—N—$[(CH_2)_m(PO_3H_2)]_2$, and groups containing partial ester or salt thereof. Here, X, m, n and Sp are the same as those mentioned above.

(vi) When the functional group contains at least two phosphonic acid groups, examples of the functional group may include groups having at least one formula —CR=C$(PO_2H_2)_2$, and groups containing partial ester or salt thereof.

Here, R represents H, $C_1$ to $C_{18}$ saturated or unsaturated and branched or non-branched alkyl group, $C_1$ to $C_{18}$ saturated or unsaturated and branched or non-branched acyl group, aralkyl group, alkaryl group or aryl group. R is preferably H, $C_1$ to $C_6$ alkyl group or aryl group.

(vii) Furthermore, when the functional group contains at least two phosphonic acid groups, the functional group may be a group containing two or more phosphonic acid groups, or a group containing partial ester or salt thereof. Examples of such a functional group include groups having the formula —X—[CQ($PO_3H_2$)$_2$]$_p$, and groups containing partial ester or salt thereof. X and Q are the same as those mentioned above. X is preferably an arylene group, heteroarylene group, alkylene group, alkarylene group or aralkylene group. p denotes 1 to 4 and preferably 2.

(viii) Also, when the functional group contains at least two phosphonic acid groups, the functional group may be a group containing at least one vicinal bisphosphonic acid group, or partial ester or salt thereof. This means that these groups are adjacent to each other. Examples of such a functional group include groups containing two phosphonic acid groups bonded to adjacent carbon atoms, and partial esters and salts thereof. Such a group is called 1,2-diphosphonic acid group, or partial ester or salt thereof. Examples of the group containing two phosphonic acid groups, or partial esters or salts thereof include aromatic groups and alkyl groups. Examples of the vicinal bisphosphonic acid group include vicinal alkyl groups, vicinal aryldiphosphonic acid groups, and partial esters and salts thereof. Specific examples of the functional group include groups having the formula —$C_6H_3$—($PO_3H_2$)$_2$, and groups containing partial ester or salt thereof. Here, the acid, ester or base groups are each located at ortho-positions to each other.

(ix) Other Phosphorus-Containing Groups

A reactive surfactant having phosphorus may be used as a monomer having a phosphorus-containing group. As a phosphate type reactive surfactant having a P=O bond, ADEKA REASOAP PP-70, SDX-334, SDX-731 and the like manufactured by ADEKA Corporation and H-3330PL and the like manufactured by Dai-ichi Kogyo Seiyaku Co., Ltd. are commercially available.

Here, the molecular formula of ADEKA REASOAP PP-70 is [$CH_2$=$CHCH_2O(CH_2C(CH_3)$ HO)$_m$]$_L$P(=O)—(OH)$_{3-L}$ (L: 1 or 2).

Also, as a monomer containing a phosphorus-containing functional group having at least one P—O or P=O bond and a polymerizable double bond, $CH_2$=CH-φ-P(O)(OH)$_2$, $CH_2$=CH-φ-OP(O) (OR)$_2$, $CH_2$=CH-φ-OP(S) (OR)$_2$ and $CH_2$=CH-φ-OP(O) ClR (in the above formulas, φ represents a benzene ring, and R represents an alkyl group having 1 to 6 carbon atoms) may be exemplified, and further, monomers disclosed in JP-A 2000-178478, JP-A 2000-314030 and JP-A 3-095209 may be used.

(2-2) Calcium Index of Phosphorus-Containing Group

If at least one phosphorus-containing group having at least one P—O or P=O bond is bound to the surface of the pigment, the effect of restraining the penetration of the pigment (P) into the recording medium (R) to thereby limit bleeding will be exhibited, as mentioned above. In this case, the phosphorus-containing group preferably has a larger calcium index than the calcium index of 1,2,3-benzenetricarboxylic acid as mentioned above. Here, the calcium index indicates a measure of ability to coordination-bind dissolved calcium ions, that is, ability of the functional group which captures the calcium ions. The larger the calcium index is, the more strongly and more effectively the functional group coordination-binds the calcium ions. According to Patent Document 5, when an inkjet ink (I) containing a pigment component having a phosphorus-containing group bound thereto as mentioned above is printed on printing paper, the phosphorus-containing group interacts or binds with a calcium salt or another divalent metal salt existing in or on the surface of the printing paper, with the result that the pigment is easily fixed to the paper.

As described in Patent Document 5, as a method of measuring the calcium index, for example, a method measuring the amount of calcium coordination-bound by a compound in a standard solution containing soluble calcium ions and a color indicator using ultraviolet-visible spectroscopy may be adopted. Also, the calcium index of a compound having a deep color may be measured by using the NMR method. Each method will be explained hereinunder.

(i) Ultraviolet-Visible Spectroscopy

An example of the ultraviolet-visible spectroscopy will be described.

First, a series of solutions containing a 0.087 mM congo-red indicator, 5 mM cesium chloride, 1 mass % of polyethylene glycol methyl ether having a molecular weight (MW) of 350 and calcium chloride having a concentration in a range of 0 mM to 7 mM (0.2, 0.5, 1, 2, 3, 4, 4.5, 5, 6 and 7 mM) are prepared at pH of 9. The ultraviolet-visible spectrums of these solutions are recorded using an ultraviolet-visible absorptiometer (manufactured by Shimadzu Corporation, model: UV-2501PC) within one hour after these solutions are prepared. Using these spectrums, a calibration curve showing the relation between the absorbance at 520 nm and the concentration of calcium is formed.

Next, a compound corresponding to a specific functional group bound to the surface of a resin is selected. With regard to, for example, a surface-treated resin with a 3,4,5-tricarboxyphenyl group or salt thereof bound to the surface thereof, 1,2,3-benzenetricarboxylic acid is selected. Then, an inspection solution containing a 0.087 mM congo-red indicator, 1 mass % of polyethylene glycol methyl ether having a MW of 350, 5 mM calcium chloride and a cesium salt of a relative compound having an ion concentration of 5 mM at pH of 9 is prepared at pH of 9. The concentration of non-complexed calcium is determined by comparison with the calibration curve. In succession, the calcium index is calculated as $\log_{10}$ ((0.005-Non-complexed calcium)/((Non-complexed calcium)$^2$)). A duplicate test is made to measure and measured data is averaged.

The above ultraviolet-visible spectroscopy is used to determine the calcium indices of various compounds relating to functional groups in the surface-treated resin. Specific examples are shown in Table 1 below.

TABLE 1

| Chemical Compound | Calcium index |
| --- | --- |
| Toluenesulfonic acid | 0.78 |
| Benzoic acid | 1.27 |
| Isophthalic acid | 1.76 |
| Phthalic acid | 2.05 |
| Succinic acid | 2.37 |
| Benzohydroxamic acid | 2.43 |
| 1,2,4-benzenetricarboxylic acid | 2.53 |
| Benzenephosphonic acid | 2.53 |
| 1,2,3-benzenetricarboxylic acid | 2.79 |
| 2,3-dihydroxypyridine | 3.06 |
| 8-hydroxyquinoline | 3.08 |
| 2-hydroxypyridine oxide | 3.27 |
| Methylenediphosphonic acid | 3.45 |

As shown by the data in Table 1, 2-hydroxypyridine N-oxide (1-hydroxypyridone), 8-hydroxyquinoline and methylenediphosphonic acid each have a larger calcium index than the calcium index of 1,2,3-benzenetricarboxylic acid. It is expected that compounds containing these functional groups or similar functional groups (for example, groups containing other bisphosphonates or at least two phosphonic acid groups, partial esters or salts thereof) each likewise have a large calcium index.

(ii) NMR Method

As to compounds having difficulty in the application of the above ultraviolet-visible spectroscopy because they have a deep color, the NMR method may be used. An example of the NMR method will be explained.

First, an aqueous solution which is 0.01 M for $^{43}CaCl_2$, 0.01 M for NaCl and 10% for $D_2O$ and has a pH of 8 or 9 is prepared from $^{43}CaCO_3$, $HCl/D_2O$, $NaOH/D_2O$, $D_2O$ and water. The pH is selected so as to ionize a compound which is an investigation object and also to dissolve the compound. Apart of the solution weighing about 0.65 g is added to a 5 mm NMR tube and weighed to the order of 0.001 g. A NMR spectrometer (manufactured by Bruker Co., Ltd., model: Avarice II) is used to measure the chemical shift of non-bound $^{43}Ca$ by using a proton resonant frequency at 400.13 MHz. A 0.2 to 1.0 M solution of the investigation object compound (ligand) is added in continuous increments. After each of the increments, the chemical shift of $^{43}Ca$ is measured to calculate δ which is a difference between the chemical shift of a sample and the chemical shift of non-bound calcium. The continuous increments are so designed that the ratio $L_0/Ca_0$ (here, $L_0$ is the total concentration of anions which are complexed from a ligand, and protonated and are free and $Ca_0$ is the total concentration of calcium in all existing chemical species) is 0.25, 0.5, 1, 2, 3, 4, 6 and 8. The calcium binding index (NMR) is calculated as $\log_{10}(X)$ to determine X by fitting the parameter X and $\delta_m$ in the following equation such that a difference in RMS between the data and a chemical shift estimated from the equation is minimized.

[Equation 1]
$$\delta = \frac{\delta_m}{2}\left[ [1 + (L_0/Ca_0) + (1 + H^+/K_a)/(XCa_0)] - \sqrt{[1 + (L_0/Ca_0) + (1 + H^+/K_a)/(XCa_0)]^2 - 4(L_0/Ca_0)} \right]$$

Here, δ represents a difference between the chemical shift of $^{43}Ca$ of the sample and the chemical shift of free aqueous $^{43}Ca^{2+}$; $\delta_m$ represents a calculated difference between the chemical shift of $^{43}Ca$ in infinite L/Ca and the chemical shift of free $^{43}Ca^{2+}$; $L_0$ represents the total concentration of anions which are complexed from a ligand, protonated and free; $Ca_0$ represents the total concentration of calcium in all existing chemical species; X represents a parameter to be fitted; and $K_a$ represents the proton dissociation constant of a ligand LH.

The above NMR method is used to determine the calcium indices of various compounds relating to functional groups in the surface-treated resin. Specific examples are shown in Table 2 below.

TABLE 2

| Chemical Compound | Calcium index |
| --- | --- |
| Benzoic acid | 0.58 |
| 1,2,3-benzenetricarboxylic acid | 1.99 |
| 2-chloro-4-methyl-6-nitrosophenol | 2.22 |

The calcium index calculated by the NMR method is different from that calculated by the ultraviolet-visible spectroscopy and cannot be therefore compared directly with the calcium index calculated by the ultraviolet-visible spectroscopy.

In the present invention, the reference for the evaluation of calcium index is 1,2,3-benzenetricarboxylic acid. The functional group bound to the surface of the resin has a larger calcium index than the calcium index of 1,2,3-benzenetricarboxylic acid. The calcium index of the functional group is preferably above 2.8, more preferably above 3.0 and particularly preferably above 3.2 when it is measured by the ultraviolet-visible spectroscopy.

(3) Anionic Resin Emulsion (E)

The anionic resin emulsion (E) in the present invention means an aqueous dispersion solution in which the continuous phase is water and the dispersed particles are resin microparticles. The above anionic resin emulsion (E) generally has such a nature that it is thickened and coagulated when the amount of water which is the continuous phase is reduced by evaporation or penetration, and has the effect of restraining the penetration of the pigment (P) into printing paper to promote the fixation of the pigment to the paper.

The anionic resin emulsion (E) may be produced, for example, by blending water, a monomer, an emulsifier and a polymerization initiator to undergo an emulsion-polymerization reaction, followed by neutralizing. As the emulsifier, a usual polymer-type surfactant may be used, or a reactive emulsifier having an unsaturated bond may be used. The anionic resin emulsion (E) may also be obtained by blending resin microparticles with water together with a surfactant, without running an emulsion polymerization reaction. For example, the anionic resin emulsion (E) may be obtained by adding and mixing resin microparticles constituted of a (meth)acrylic ester or styrene and the (meth)acrylic ester together with a surfactant into water. In this case, the blending ratio (ratio by weight) of the resin component to the surfactant is usually preferably about 10:1 to 5:1. When the ratio of the surfactant to be used falls within the above range, the water resistance and penetrability of the ink become high, whereas when the ratio of the surfactant is less than the above range, an emulsion is scarcely formed.

As the anionic resin emulsion (E) (may be referred to as "resin emulsion (E)" hereinafter) which is to be added to the inkjet ink (I) of the present invention, there are an anionic resin emulsion (E1) having no phosphorus-containing group having a P—O or P=O bond bound to the surface thereof (may be referred to as "resin emulsion (E1)" hereinafter) and an anionic resin emulsion (E2) having a phosphorus-containing group having at least one P—O or P=O bond bound to the surface thereof (may be referred to as "resin emulsion (E2)" hereinafter).

(3-1) Resin Emulsion (E1)

The resin emulsion (E1) having no phosphorus-containing group having a P—O or P=O bond bound to the surface thereof will be described hereinunder, and when it has a common feature to the resin emulsion (E2) having a phosphorus-containing group having at least one P—O or P=O bond bound to the surface thereof, it will be described as the resin emulsion (E).

Preferred examples of the resin component constituting the anionic resin emulsion (E) include (meth)acrylic resin, styrene resin, polyester resin, vinyl resin, polyethylene resin, urethane resin, silicone resin, acrylamide resin, epoxy resin, resin containing an acid group such as (meth)acrylic acid and mixtures of these resins. Particularly, the resin microparticles preferably contain (meth)acrylic resin. No particular limitation is imposed on the form of a copolymer, and the copolymer may be, for example, any of a block copolymer, random copolymer and the like.

As these resin components, polymers having both a hydrophilic part and a hydrophobic part are preferable, and the average particle diameter is preferably 500 nm or less and more preferably 100 nm or less though no particular limitation is imposed on the average particle diameter as long as an emulsion can be formed. If the particle diameter of the resin component constituting the resin emulsion (E) is larger than 500 nm, so that the difference in particle diameter between the resin component and the pigment particles increases, when the inkjet ink is discharged to form dots, the resin particles formed from resin emulsion particles are brought into contact with each other, and pigment particles exist in spaces between resin particles, resulting in the formation of sea-island structures. Therefore, there is a fear that the fixability of the pigment (P) is hindered.

(i) Emulsifier, Polymerization Initiator, Chain Transfer Agent

The emulsifier and the polymerization initiator which are used for the above emulsion polymerization will be explained.

As the emulsifier, for example, an anionic surfactant, nonionic surfactant or amphoteric surfactant may be used. Also, a reactive surfactant may be used.

As the polymerization initiator, potassium persulfate, ammonium persulfate, hydrogen persulfate, azobisisobutyronitrile, benzoyl peroxide, dibutyl peroxide, peracetic acid, cumenehydroperoxide, t-butylhydroxy-peroxide or paramenthanehydroxy-peroxide may be used.

As the chain transfer agent for polymerization, t-dodecylmercaptan, n-dodecylmercaptan, n-octylmercaptan, xanthogenes such as dimethylxanthogene disulfide and diisobutylxanthogene disulfide, dipentene, indene, 1,4-cyclohexadiene, dihydrofuran, xanthene or the like may be used.

(ii) Monomer Component
(ii-1) Monomer

An unsaturated vinyl monomer is preferably used as the monomer to be used in the aforementioned emulsion polymerization. Specific examples of the unsaturated vinyl monomer include acrylic ester monomers, methacrylic ester monomers, aromatic vinyl monomers, vinyl ester monomers, vinylcyan compound monomers, halogenated monomers, olefin monomers and diene monomers which are usually used in emulsion polymerization.

Specific examples of the above monomer include acrylic esters such as methyl acrylate, ethyl acrylate, isopropyl acrylate, n-butyl acrylate and isobutyl acrylate; methacrylic esters such as methyl methacrylate, ethyl methacrylate, isopropyl methacrylate and n-butyl methacrylate; vinyl esters such as vinyl acetate; vinylcyan compounds such as acrylonitrile and methacrylonitrile; halogenated monomers such as vinylidene chloride and vinyl chloride; aromatic vinyl monomers such as styrene, 2-methylstyrene, vinyltoluene, t-butylstyrene and chlorostyrene; olefins such as ethylene, propylene and isopropylene; dienes such as butadiene and chloroprene; and vinyl monomers such as vinyl ether, vinyl ketone and vinyl pyrrolidone. It is essential to utilize an unsaturated vinyl monomer having a carboxyl group for monomers having no carboxyl group. Preferable examples of the above monomer include acrylic acid, methacrylic acid, itaconic acid, fumaric acid and maleic acid, and it is more preferable to use methacrylic acid.

(ii-2) Crosslinking Monomer

The resin microparticles forming the resin emulsion (E) can be designed to have a structure crosslinked by a crosslinking monomer having two or more polymerizable double bonds. Examples of the crosslinking monomer having two or more polymerizable double bonds include diacrylate compounds such as polyethylene glycol diacrylate, triethylene glycol diacrylate and 1,3-butylene glycol diacrylate; triacrylate compounds such as trimethylolpropane triacrylate, trimethylolethane triacrylate and tetramethylolmethane triacrylate; dimethacrylate compounds such as ethylene glycol dimethacrylate, diethylene glycol dimethacrylate and triethylene glycol dimethacrylate; trimethacrylate compounds such as trimethylolpropane trimethacrylate and trimethylolethane trimethacrylate; and divinylbenzene.

Printing stability can be further improved by adding an acrylamide or a hydroxyl group-containing monomer in addition to the above monomer. Specific examples of the acrylamide include acrylamide and N,N-dimethylacrylamide. Specific examples of the hydroxyl group-containing monomer include 2-hydroxyethyl acrylate, 2-hydroxypropyl acrylate and 2-hydroxyethyl methacrylate. These compounds may be used either singly or in combinations of two or more.

(iii) Neutralizer

As a neutralizer which is used after the end of the emulsion polymerization reaction, an acid or base may be used according to the type of a salt-generating group. Examples of the acid include inorganic acids such as hydrochloric acid and sulfuric acid, and organic acids such as acetic acid, propionic acid, lactic acid, succinic acid, glycolic acid, gluconic acid, and glyceric acid. Examples of the base include tertiary amines such as trimethylamine and triethylamine, ammonia, sodium hydroxide, potassium hydroxide and 2-amino-2-methyl-1-propanol.

There is no particular limitation to the degree of neutralization. Although the resin emulsion (E) preferably has a pH of 7 to 10, it is necessary that the concentration of ionic components be so properly regulated that the conductance of the resin emulsion (E) does not become high.

(iv) Molecular Weight of Resin Emulsion (E)

The molecular weight of the resin emulsion (E) is preferably about 1,000 to 1,000,000. The solid content of the resin emulsion (E) may be, for example, about 0.05 to 20 mass based on the total amount of the inkjet ink (I) though no particular limitation is imposed on the resin emulsion (E) content of the inkjet ink (I).

(v) Conductance of Resin Emulsion (E)

When a surface-treated pigment which will be described hereinafter is used as the pigment (P) in the inkjet ink (1) of the present invention, it is considered that reactivity between the resin emulsion (E) and the surface-treated pigment can be reduced due to the low conductance of an aqueous solution containing 1 mass % of a solid content of the resin emulsion (E). Here, the expression "an aqueous solution containing 1 mass % of a solid content of the resin emulsion" means a solution obtained by dissolving or dispersing the resin emulsion (E) in water such that the solid concentration is 1 mass %.

The conductance of the aqueous solution containing 1 mass % of a solid content of the resin emulsion (E) can be adjusted by the type of the resin component, the type of the monomer, the reaction mechanism, the type of the emulsifier, the existence or absence of addition of the emulsifier and the type of the neutralizer.

The low conductance of the aqueous solution containing 1 mass % of a solid content of the resin emulsion (E) is considered to show that ionic groups and counter ions of these ionic groups which the resin emulsion (E) itself contains exist in slight amounts in the ink. Also, the low conductance of the aqueous solution containing 1 mass % of a solid content of the resin emulsion (E) is considered to show that impurities such as ionic materials originated from the production of the resin emulsion (E) are contained in small amounts in the ink. It is also considered that the conductance becomes high according to the type of the monomer constituting the resin when a large amount of an unsaturated bond or a polar group such as a carboxyl group is introduced into the resin.

It is predicted that the functional group having a large calcium index in the resin emulsion (E) tends to interact with ionic groups, counter ions of these ionic groups and ionic impurities contained in the surface-treated pigment. Because this functional group contributes to the dispersion stability of the surface-treated pigment, the dispersion function is deteriorated by the above interaction if the ionic groups, counter ions and ionic impurities are contained in large amounts in the ink. Therefore, if the conductance of the aqueous solution containing 1 mass % of a solid content of the resin emulsion is high, the dispersion condition of the surface-treated pigment is considered to be impaired when the resin emulsion is blended with the pigment dispersion containing the surface-treated pigment to prepare ink.

On the other hand, it is predicted that, by selecting a resin emulsion having a low conductance of the aqueous solution containing 1 mass % of a solid content of the resin emulsion, the amounts of ionic groups, counter ions of these ionic groups and ionic impurities existent in the resin emulsion can be made small, and the interaction between the functional group having a large calcium index in the surface-treated pigment and the ionic groups, counter ions and ionic impurities in the resin emulsion (E) and also the coagulation of the surface-treated pigment caused by the interaction can be reduced. Therefore, in the present invention, the storage stability of the inkjet ink (I) can be made high.

The conductance of the aqueous solution containing 1 mass % of a solid content of the resin emulsion (E) is preferably 300 µS/cm or less, more preferably 200 µS/cm or less and even more preferably 150 µS/cm or less. If the above conductance is high, there is a fear that ionic groups, counter ion of these ionic groups and ionic impurities in the resin emulsion (E) affect the dispersion stability of the surface-treated pigment. Because the influence on the dispersibility of the surface-treated pigment is suppressed by reducing the total content of ions in the resin emulsion (E), the conductance of the aqueous solution containing 1 mass % of a solid content of the resin emulsion (E) is lower, the better. The lower limit of the conductance is about 20 µS/cm. A resin emulsion having an excessively low conductance is deteriorated in dispersibility and has difficulty in the production of a resin emulsion having stable quality.

As a method for measuring the conductivity, a method is adopted in which, first, the resin emulsion is diluted with ion exchange water to a solid content of 1 mass %, thereby preparing the aqueous solution containing 1 mass % of a solid content of the resin emulsion, and then, the conductance of the aqueous solution containing 1 mass % of a solid content of the resin emulsion is measured by using a conductance meter (manufactured by Eutech Instruments, model: EC Testr 11+).

(3-2) Resin Emulsion (E2)

An example of the resin emulsion (E2) having a phosphorus-containing group bound to the surface thereof is a resin emulsion (E2) having a phosphorus-containing group having at least one P—O or P=O bond bound to the surface thereof. When the inkjet ink (I) containing the resin emulsion (E2) is used to print, bleeding is further suppressed, thereby improving fixability to paper, so that an inkjet ink capable of printing a more clear image can be obtained.

The resin emulsion (E2) is the same as the above resin emulsion (E1) except that a phosphorus-containing group having at least one P—O or P=O bond is bound to the surface thereof.

To improve the fixability of the pigment (P) by making use of reactivity with a calcium ion contained in printing paper, the phosphorus-containing functional group to be bonded to the resin of the resin emulsion (E2) contains at least one phosphorus-containing group having at least one P—O or P=O bond. The phosphorus-containing functional group is at least one selected from phosphonic acid group, phosphinic acid group, phosphinous acid group, phosphite group, phosphate group, diphosphate group, triphosphate group, pyrophosphate group, and partial esters and salts thereof. Among these groups, the phosphorus-containing functional group preferably contains at least one phosphonic acid group, or partial ester or salt thereof and particularly preferably contains at least two phosphonic acid groups, or partial esters or salts thereof. Here, "partial ester thereof" means that the phosphonic acid group is a partial phosphonate ester group having the formula —$PO_3RH$ or salt thereof. Here, R is an aryl, alkaryl, aralkyl or alkyl group. To introduce the above phosphorus-containing functional group into the resin contained in the resin emulsion, a method in which a monomer having the phosphorus-containing functional group is blended with the monomer component in a certain ratio to introduce the phosphorus-containing functional group into the resin contained in the resin emulsion when the resin emulsion is to be produced by polymerization or a method in which a compound having the phosphorus-containing functional group is added to the resin contained in the resin emulsion by a known method may be adopted.

The resin emulsion (E2) whose surface is modified with the phosphorus-containing group used in the present invention preferably has a functional group with a larger calcium index than the calcium index of the aforementioned 1,2,3-benzenetricarboxylic acid bound to the surface thereof. In the present invention, when the resin emulsion (E2) having at least one functional group with a larger calcium index than the calcium index of 1,2,3-benzenetricarboxylic acid bound to the surface thereof is used, bleeding is suppressed, thereby improving the fixability to the recording medium (R) of the pigment (P2) so that a more clear image can be printed.

The phosphorus-containing functional group having a larger calcium index than the calcium index of 1,2,3-benzenetricarboxylic acid is the same as the phosphorus-containing functional group described in the section for the aforementioned pigment (P2).

(4) Surfactant

The inkjet ink (I) of the present invention generally contains a surfactant. The surfactant contained in the inkjet ink serves to improve the discharge ability of ink in the inkjet system and adjust the surface tension of the inkjet ink. Though no particular limitation is imposed on the surfactant, an anionic surfactant, a nonionic surfactant, a silicone type surfactant, a fluorine type surfactant and an acetylene glycol type surfactant are preferably used because they are excellent in the adjustability of surface tension. Specific examples of the surfactant include EMAL, LATEMUL, PELEX, NEOPLEX and DEMOL (all of these products are anionic surfactants; manufactured by Kao Corporation), SUNNOL, LIPOLAN, LIPON and LIPAL (all of these products are anionic surfactants; manufactured by Lion Corporation), NOIGEN, EPAN and SORGEN (all of these products are nonionic surfactants; manufactured by Dai-Ichi Kogyo Seiyaku Co., Ltd.), EMULGEN, AMIET and EMASOL (all of these products are nonionic surfactants; manufactured by Kao Corporation), NAROACTY, EMULMIN and SANNONIC (all of these products are nonionic surfactants; manufactured by Sanyo Chemical Industries, Ltd.), SURFYNOL 104, 82, 465, 485, TG, 2502, Dinol 604 and Dinol 607 (all of these products are acetylene glycol type surfactants; manufactured by Air Products Japan, Inc.), OLFINE E1004, E1010, PD004 and EX4300 (all of these products are acetylene glycol type surfactants; manufactured by Nissin Chemical Industry Co., Ltd.), MEGAFAC (fluorine type surfactant; manufactured by DIC Co., Ltd.), SURFLON (fluorine type surfactant; manufactured by AGC Seimi Chemical Co., Ltd.), BYK302, 306, 307, 331, 333, 345, 347, 348, 349 and 3455 (all of these products are silicone type surfactants; manufactured by BYK-CHEMIE GmbH), and KP-110, 112, 323, 341 and 6004 (all of these products are silicone type surfactants; manufactured by Shin-Etsu Chemical Co., Ltd.). The content of the surfactant is properly adjusted according to the content of the water-soluble organic solvent and the content of other surfactants. The content of the surfactant is preferably in a range of about 0.01 to 3 mass % and more preferably in a range of 0.1 to 2.0 mass % in the inkjet ink (I).

(5) Additives

The inkjet ink (I) of the present invention may contain other optional components besides the above components. For example, a penetrant, wetting gent, antiseptic, antioxidant, conductance regulator, pH regulator, viscosity regulator, surface tension regulator, antifoaming agent and oxygen absorber may be added to the inkjet ink (I) of the present invention.

(i) Penetrant

According to a preferred embodiment of the present invention, the inkjet ink (I) preferably contains a penetrant. Though some types of below-mentioned water-soluble organic solvents are able to function as a penetrant, preferable examples of the penetrant in the present invention include 1,2-alkyldiol, glycol ether, acetylene glycol type surfactants, and acetylene alcohol type surfactants, and these may be used either singly or in combinations of two or more. Specific examples of the 1,2-alkyldiol include 1,2-hexanediol and 1,2-pentanediol. Specific examples of the glycol ether include diethylene glycol monobutyl ether, diethylene glycol monopentyl ether, diethylene glycol monohexyl ether and 3-methoxy-3-methyl-1-butanol. The amount of 1,2-alkylene glycol or glycol ether to be added is preferably 1 to 15 mass % and more preferably 1 to 10 mass % based on the total weight of the inkjet ink (I).

(ii) Wetting Agent

According to a preferred embodiment of the present invention, the inkjet ink (I) preferably further contains a wetting agent. As the wetting agent, one comprising a water-soluble organic solvent having a boiling point of 180° C. or more, water absorbing ability and water retentivity is preferably used. Preferred examples of the wetting agent include glycerin, ethylene glycol, diethylene glycol, triethylene glycol, polyethylene glycol, 1,3-propanediol, propylene glycol, dipropylene glycol, tripropylene glycol and triethylene glycol. The amount of the wetting agent to be added is preferably in a range of 5 to 30 mass % and more preferably 5 to 20 mass % in the inkjet ink (I). In the present invention, a tertiary amine may be utilized as the wetting agent. Examples of the tertiary amine include trimethylamine, triethylamine and triethanolamine. These may be used either singly or in combinations of two or more. The amount of the tertiary amine to be added is preferably in a range of about 0.3 to 1 mass % and more preferably about 0.5 to 1 mass % in the inkjet ink (I).

(6) Solvent

In the inkjet ink (I) of the present invention, water, a water-soluble organic solvent or a mixture of these solvents is used as the aqueous solvent. Examples of the water-soluble organic solvent include alkyl alcohols having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol and n-pentanol; monohydric alcohols such as 3-methoxy-3-methyl-1-butanol, 3-methoxy-1-propanol, 1-methoxy-2-propanol and 3-methoxy-n-butanol; amides such as dimethylformamide, dimethylacetamide, 3-methoxypropanamide, 3-butoxypropanamide, N,N-dimethyl-3-methoxypropanamide, N,N-dibutyl-3-methoxypropanamide, N,N-dibutyl-3-butoxypropanamide and N,N-dimethyl-3-butoxypropanamide; ketones and ketoalcohols such as acetone and diacetone alcohol; ethers such as tetrahydrofuran and dioxane; oxyethylene and oxypropylene copolymers such as polyethylene glycol and polypropylene glycol; diols such as ethylene glycol, propylene glycol, diethylene glycol, dipropylene glycol, 1,3-propanediol, isopropylene glycol, isobutylene glycol, triethylene glycol, tripropylene glycol, tetraethylene glycol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol and 3-methyl-1,5-pentanediol; triols such as glycerin, trimethylolethane, trimethylolpropane and 1,2,6-hexanetriol; tetrahydric alcohols such as mesoerythritol and pentaerythritol; monoalkyl ethers such as ethylene glycol monomethyl (or ethyl, isopropyl, n-butyl, isobutyl, n-hexyl or 2-ethylhexyl)ether, diethylene glycol monomethyl (or ethyl, isopropyl, n-butyl, isobutyl, n-hexyl or 2-ethylhexyl)ether, triethylene glycol monomethyl (or ethyl, isopropyl, n-butyl or isobutyl) ether, propylene glycol monomethyl (or ethyl, isopropyl, n-butyl or isobutyl) ether and dipropylene glycol monomethyl (or ethyl, isopropyl, n-butyl or isobutyl)ether; dialkyl ethers of a polyhydric alcohol such as diethylene glycol dimethyl ether, diethylene glycol diethyl ether, diethylene glycol ethyl methyl ether, triethylene glycol dimethyl ether, triethylene glycol diethyl ether, tetraethylene glycol dimethyl ether, tetraethylene glycol diethyl ether, propylene glycol dimethyl ether, propylene glycol diethyl ether, dipropylene glycol dimethyl ether and dipropylene glycol diethyl ether; alkanolamines such as monoethanolamine, diethanolamine, triethanolamine, N-methylethanolamine, N-ethylethanolamine, N-butylethanolamine, N-methyldiethanolamine, N-ethyldiethanolamine and N-butyldiethanolamine; nitrogen-containing heterocyclic compounds such as N-methyl-2-pyrrolidone, 2-pyrrolidone and 1,3-dimethyl-2-imidazolidinone; and cyclic compounds such as γ-butyrolactone and sulfolane. Water and these water-soluble organic solvents may be used either singly or in combinations thereof. Not usual water containing various ions but deionized water is preferably used as the above water. When the inkjet ink (I) contains water, the content of water may be designed to be in a range of about 20 to 80 mass % and preferably in a range of 30 to 50 mass % in the inkjet ink (I) though no particular limitation is imposed on it.

(7) Composition of Inkjet Ink (I)

No particular limitation is imposed on the content of the pigment dispersion in the inkjet ink (I) as long as a sufficient image density can be attained. Specifically, the content of the pigment (P) in the pigment dispersion is preferably in a range of 0.05 to 20 mass % in the inkjet ink (I). At this time, the sum of the solid contents of the pigment (P) of the pigment dispersion and the resin emulsion is preferably in a range of 0.1 to 30 mass % in the inkjet ink (I).

(IV) Inkjet Ink Recording Method

The inkjet ink recording method of the present invention is characterized in that the inkjet ink (I) is used to print on the ink-receiving solution (A) applied part of the recording medium (R).

Although the inkjet ink (I) of the present invention may be used in any of piezo system, thermal system and electrostatic system inkjet recording devices, it is particularly preferably used in a piezo system inkjet recording device. A piezo system recording head uses a piezoelectric vibrator as a pressure generator and increases/decreases the pressure in a pressure room by the deformation of the piezoelectric vibrator to thereby discharge ink droplets. In such a recording head, attempts have been made to further improve a high-quality image and recording speed. An attempt to increase the number of recordable colors by increasing the number of nozzle rows has been made to further improve a high-quality image. Also, an attempt to increase the number of nozzle openings constituting one nozzle row has been made to improve recording speed.

However, if the head nozzle is microsized, flight bending and nozzle clogging are easily caused by stuck and left ink. Also, when coagulates are generated in ink components in long-term use, this is a hindrance to the flight of ink droplets, causing troubles such as flight bending and nozzle clogging. For this, it is of urgent necessity to develop an inkjet ink which does not cause clogging of an ink jet head and can be stably discharged. Accordingly, as compared with a system, such as a thermal jet which easily generates coagulates by heating, the piezo system inkjet is more resistant to the generation of coagulates due to its driving scheme, and also, the inkjet ink (I) of the present invention can further inhibit the generation of coagulates. Therefore, the inkjet ink (I) of the present invention is suitable for use in a piezo system inkjet recording device.

(V) Ink Set for Inkjet Recording

The ink set for inkjet recording of the present invention includes the ink-receiving solution (A) and the inkjet ink (I), the ink-receiving solution (A) is prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.005 to 2.0 mol/l and the concentration of the resin (B) becomes 0.5 to 20 mass %, and the inkjet ink (1) comprises at least a pigment (P), an anionic resin emulsion (E), a surfactant and an aqueous solvent, wherein a phosphorus-containing group having at least one P—O or P=O bond is bound to the surface of the pigment (P) and/or the surface of the anionic resin emulsion (E).

The ink-receiving solution (A) and the inkjet ink (1) in the ink set for inkjet recording of the present invention are as mentioned above. By applying the ink-receiving solution (A) to a part to be printed by using the inkjet ink (I) of the ink set for inkjet recording of the present invention or the entire printing surface, the phosphorus-containing group bound to the surface of the pigment (P) or the surface of the anionic resin emulsion (E) contained in the ink acts on the metal salt (S) contained in the ink-receiving solution (A) to greatly improve fixability to the recording medium (R), thereby significantly suppressing feathering and color bleeding so that a clear image having little bleeding can be obtained.

EXAMPLES

The present invention will be explained in detail by way of examples and comparative examples. The present invention is not limited by the following examples. First, the recording medium, the preparation of the ink-receiving solution, the preparation of the inkjet ink and the evaluation method which were used in examples and comparative examples will be explained.

(1) Recording Medium

The following high-quality paper, coat paper and cloth as absorbing materials and the following polyester as a non-absorbing material were used to be printed by using the inkjet ink.

(i) High-Quality Paper

The high-quality paper (trade name: OK Prince) of Oji Paper Co., Ltd. was used as the high-quality paper which is uncoated paper.

(ii) Coat Paper

The coat paper (trade name: OK Topcoat +) of Oji Paper Co., Ltd. was used as the coat paper which is coated paper.

(iii) Cloth

Kanakin No. 3 attached white cloth for tests (based on JIS L0803)

(iv) Polyvinyl Chloride

Shiny vinyl chloride (trade name: JT5829R) of MACtac Co., Ltd.

(v) Polyester

Polyester (trade name: PET50 (K2411)) of Lintec Corporation (iv) Metal Foil Coat Paper Aluminum deposited polyester (trade name: FNS Tsuya) of Lintec Corporation (2) Preparation of Ink-Receiving Solution Metal salts, resins and surfactants shown in Table 5 were mixed with water and dissolved in a 60° C. hot bath to prepare ink-receiving solutions shown in Table 5. In Example 13, a cationic resin emulsion was uniformly dispersed in the ink-receiving solution.

Gelatin (trade name: APH-200) manufactured by Nitta Gelatin Inc. was used as gelatin which is a component of the ink-receiving solution, and polyvinyl alcohol (trade name: POVAL APH-117) manufactured by Kuraray Co., Ltd. was used as polyvinyl alcohol (to be referred to as PVA in Table 5). ACRIT UW-319SX (trade name) manufactured by Taisei Fine Chemical Co., Ltd. was used as a cationic resin emulsion.

(3) Preparation of Inkjet Ink (3-1) Preparation of Pigment Dispersion

The methods of preparing pigment dispersions 1, 3, 4 and 5 (having a phosphorus-containing group) and pigment dispersions 2, 6, 7 and 8 (having no phosphorus-containing group but having a carboxyl group) used in Examples and Comparative Examples will be described hereinunder.

(i) Method of Preparing Pigment Dispersion 1 (Black) (Having a Phosphorus-Containing Group)

The same procedures as those described in Kieczykowski et al., J. Org. Chem., 1995, Vol. 60, P. 8310 to 8312 and the description of U.S. Pat. No. 4,922,007 were used to produce a [2-(4-aminophenyl)-1-hydroxyethane-1,1-diyl]bisphosphonic acid-sodium salt. First, a 500 mL three-necked flask was equipped with a condenser provided with a gas outlet at the top thereof, a thermometer, a dry nitrogen introduction port and a 100 mL equalizing dropping funnel. 32 g of phosphorous acid (380 mmol) and 160 mL of methanesulfonic acid (solvent) were first added to this flask. 57.4 g of aminophenylacetic acid (380 mmol) was added little by little to the stirred mixture. The stirred mixture was heated at 65° C. for 1 to 2 hours to dissolve the solid completely. The whole system was flushed with dry nitrogen and the temperature of the system was reduced to 40° C. after the solid was completely dissolved. 70 mL of $PCl_3$ (800 mmol) was gradually added to the heated solution through the dropping funnel. HCl gas was generated from the reaction. This gas flowed through the gas outlet to a dry tube and then through a funnel to a concentrated NaOH solution in a beaker. After the addition was completed, the reaction mixture was stirred for 2 hours and concurrently heated at 40° C. After that, the temperature of the system was raised to 65 to 70° C., and the mixture was stirred overnight. The produced supernatant brown solution was cooled to ambient temperature and quenched by addition to 600 g of an ice/water mixture.

This aqueous mixture was poured into a 1 L beaker and heated at 90 to 95° C. for 4 hours (the top of the beaker was covered with a glass plate). Then, this mixture was cooled to ambient temperature and pH of this mixture was adjusted to 4 to 5 by a 50% NaOH solution (the NaOH solution was slowly added because the temperature would rise as a result of the quenching). This mixture was cooled to 5° C. in an ice bath for 2 hours, and then, the resulting solid was collected by suction filtration. The collected solid was washed with 1 L of cooled deionized water and dried at 60° C. overnight to obtain a white or off-white solid product (yield: 48 g, 39%). $^1$H-NMR data ($D_2O$/NaOH) of this compound was as follows: 7.3 (2H, d), 6.76 (2H, d), and 3.2 (2H, t). $^{13}$C-NMR data ($D_2O$/NaOH) of this compound was as follows: 141, 130, 128, 112 and 73. These data show the production of a [2-(4-aminophenyl)-1-hydroxyethane-1,1-diyl]bisphosphonic acid-sodium salt.

With regard to the above compound, a pigment was modified by the following general procedures. Black Pearls (registered trademark) 700 Carbon Black (manufactured by Cabot Corporation) was used as carbon black. 20 g of a pigment, 20 mmol of the material produced above, 20 mmol of nitric acid and 200 mL of deionized water were blended by a Silverson mixer (6000 rpm) at ambient temperature. After 30 minutes, sodium nitrite (20 mmol) dissolved in a small amount of water was slowly added to this mixture. The temperature reached 60° C. by mixing to allow the reaction to proceed one hour. A surface-treated pigment was produced by the above process. Then, pH of the pigment was adjusted to 8 to 9 by a NaOH solution. After 30 minutes, the dispersion solution in which the surface-treated pigment (including a pigment obtained by binding at least two phosphonic acid groups or salt thereof) was produced was subjected to diafiltration with a spectrum membrane by using 20 parts by volume of deionized water to concentrate the solution to a solid content of 15 mass %.

(ii) Pigment Dispersion 2 (Black) (Commercial Product, Having a Carboxyl Group)

trade name: EMACOL SF BLACK C416F, manufactured by Sanyo Color Works, Ltd.

(iii) Pigment Dispersion 3 (Magenta) (Having a Phosphorus-Containing Group)

A pigment dispersion 3 was prepared in the same manner as the pigment dispersion 1 except that PR122 which is a magenta pigment was used in place of the carbon black of the pigment dispersion 1.

(iv) Pigment Dispersion 4 (Indigo) (Having a Phosphorus-Containing Group)

A pigment dispersion 4 was prepared in the same manner as the pigment dispersion 1 except that PB15:4 which is an indigo pigment was used in place of the carbon black of the pigment dispersion 1.

(v) Pigment Dispersion 5 (Yellow (Having a Phosphorus-Containing Group)

A pigment dispersion 5 was prepared in the same manner as the pigment dispersion 1 except that PY74 which is a yellow pigment was used in place of the carbon black of the pigment dispersion 1.

(vi) Pigment Dispersion 6 (Magenta) (Commercial Product, Having a Carboxyl Group)

trade name: EMACOL SF RED E502F, manufactured by Sanyo Color Works, Ltd.

(vii) Pigment Dispersion 7 (Indigo) (Commercial Product, Having a Carboxyl Group)

trade name: EMACOL SF BLUE H524F, manufactured by Sanyo Color Works, Ltd.

(viii) Pigment Dispersion 8 (Yellow) (Commercial Product, Having a Carboxyl Group)

trade name: EMACOL SF YELLOW J701F, manufactured by Sanyo Color Works, Ltd.

The above pigment dispersions 1 to 8 are shown in Table 3.

TABLE 3

| | Pigment | Solid content (mass %) | Functional group | pH | |
|---|---|---|---|---|---|
| Pigment dispersion 1 | carbon black | 15 | phosphonic acid group | 9.0 | *prototype |
| Pigment dispersion 2 | carbon black | 15 | carboxylic acid group | 8.0 | *commercialized product |
| Pigment dispersion 3 | magenta | 15 | phosphonic acid group | 9.0 | *prototype |
| Pigment dispersion 4 | cyan | 15 | phosphonic acid group | 9.0 | *prototype |
| Pigment dispersion 5 | yellow | 15 | phosphonic acid group | 9.0 | *prototype |
| Pigment dispersion 6 | magenta | 15 | carboxylic acid group | 8.0 | *commercialized product |
| Pigment dispersion 7 | cyan | 15 | carboxylic acid group | 8.0 | *commercialized product |
| Pigment dispersion 8 | yellow | 15 | carboxylic acid group | 8.0 | *commercialized product |

(3-2) Anionic Resin Emulsion (1) Preparation of Anionic Resin Emulsion

Anionic resin emulsions 1 and 2 were prepared by the following method. The average particle diameters of the obtained anionic resin emulsions were measured using a thick-type particle size analyzer (manufactured by Otsuka Electronics Co., Ltd., model: FPAR-1000).

(i) Preparation of Anionic Resin Emulsion 1

After the atmosphere in a flask equipped with a mechanical stirrer, a thermometer, a nitrogen introduction tube, a reflux tube and a dropping funnel was sufficiently replaced with nitrogen gas, the flask was charged with 1 g of the above REASOAP PP-70 (phosphorus-containing reactive surfactant, manufactured by ADEKA Corporation), 0.04 g of potassium persulfate, 3 g of acrylic acid and 150 g of pure water, and these were stirred at 25° C. to mix. A mixture of 22.5 g of styrene, 60 g of methyl methacrylate, 30 g of ethyl methacrylate and 34.5 g of 2-ethylhexyl acrylate was added dropwise to the above mixture to prepare a pre-emulsion. Also, after the atmosphere in a flask equipped with a mechanical stirrer, a thermometer, a nitrogen introduction tube, a reflux tube and a dropping funnel was sufficiently replaced with nitrogen gas, the flask was charged with 2.75 g of the above REASOAP PP-70 (manufactured by ADEKA Corporation), 0.01 g of potassium persulfate and 200 g of pure water, and these were stirred at 70° C. to mix. After that, the above prepared pre-emulsion was added dropwise into the flask over 3 hours. The resulting mixture was further aged at 70° C. under heating for 3 hours, then cooled and adjusted to pH of 8 by adding an aqueous ammonia solution. Then, the resulting mixture was filtered by a #150 mesh filter (manufactured by Nippon Orimono Co., Ltd.) to obtain 500 g of an anionic resin emulsion 1 (solid content of 30 mass %). The average particle diameter of the obtained resin was 150 nm.

(ii) Preparation of Anionic Resin Emulsion 2

An anionic resin emulsion 2 (solid content of 30 mass %) was obtained in the same manner as the preparation of the anionic resin emulsion 1 except that the above REASOAP PP-70 (manufactured by ADEKA Corporation) was changed to LATEMUL PD-104 (ammonium polyoxyalkylene alkenyl ether sulfate (reactive surfactant containing no phosphorus), manufactured by Kao Corporation). The average particle diameter of the obtained resin was 150 nm. The prepared anionic resin emulsions 1 and 2 are shown in Table 4.

TABLE 4

| | Resin component | amount (mass %) | average particle diameter (nm) | functional group | pH | conductance μS/cm |
|---|---|---|---|---|---|---|
| Anionic resin emulsion 1 | styrene-acrylic copolymer | 30 | 150 | phosphonic acid group | 8.0 | 118.0 |
| Anionic resin emulsion 2 | styrene-acrylic copolymer | 30 | 150 | sulfonic acid group | 8.0 | 63.1 |

(3-3) Surfactant

A surfactant (manufactured by Air Products Japan, Inc., trade name: Surfynol 465) was used to adjust the surface tension.

(3-4) Composition of Inkjet Ink

The composition of the inkjet ink is as follows.
Pigment dispersion: 33.3 (mass %) (5 mass % of pigment component)
Anionic resin emulsion 1: 16.7 (mass %) (5 mass % of resin contained in resin emulsion)
Glycerin: 20 (mass %)
Diethylene glycol: 20 (mass %)
Surfactant: 0.5 (mass %)
Water: balance
*The above content of water is expressed as balance when the total amount of the inkjet ink is 100 mass % [100 mass %–components other than water (mass %)]. The above content of water does not include the amount of water contained in the pigment dispersion and the resin emulsion.

Some of the compositions of the inkjet inks are shown in Table 5.

(4) Evaluation Method

After a color image was printed by means of PX-101 manufactured by Seiko Epson Corporation, bleeding at the color interface was evaluated visually.

[Criteria]
A: bleeding is scarcely observed
B: bleeding is markedly observed

Example 1

An ink-receiving solution prepared by using $CaCl_2$ as a metal salt to ensure that the metal concentration became 0.1 mol/l in the ink-receiving solution and gelatin as a resin to ensure that the resin concentration became 5 mass % in the ink-receiving solution as shown in Table 5 was heated at 60° C. and applied uniformly to the entire surface of coat paper by means of a wire bar (#10) which is a kind of coating means and dried at the ambient temperature. The amount of the ink-receiving solution applied to the recording medium was 200 μmol/cm² as a metal salt.

An inkjet ink having the above composition and containing the pigment dispersions 1, 3, 4 and 5 and the anionic resin emulsion 2 was used to print a Chinese character meaning "falcon" at 12-point on the surface of coat paper to which $CaCl_2$ and the resin were adhered with different colors for the background and the character and using a piezo drive system inkjet recording device (manufactured by Seiko Epson Corporation, model: PX-101). The print product is shown in FIG. 1. The bleeding of the obtained print product was evaluated.

Example 2

Figure 2:
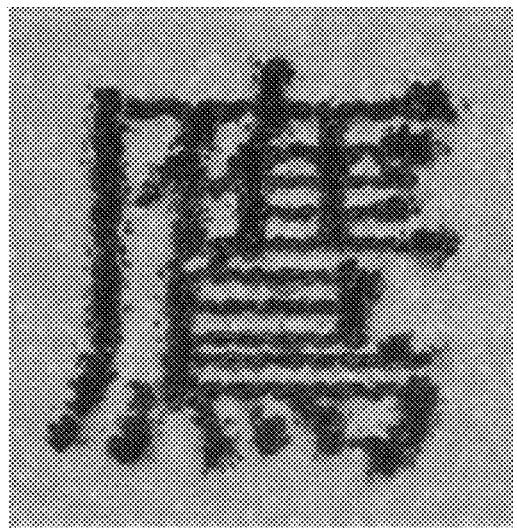
FIG. 2 shows a photograph for explaining the evaluation of bleeding in Example 2.

Printing was carried out in the same manner as in Example 1 as shown in Table 5 except that polyvinyl alcohol was used as a resin. The print product is shown in FIG. 2. The bleeding of the obtained print product was evaluated.

Example 3

Figure 3:
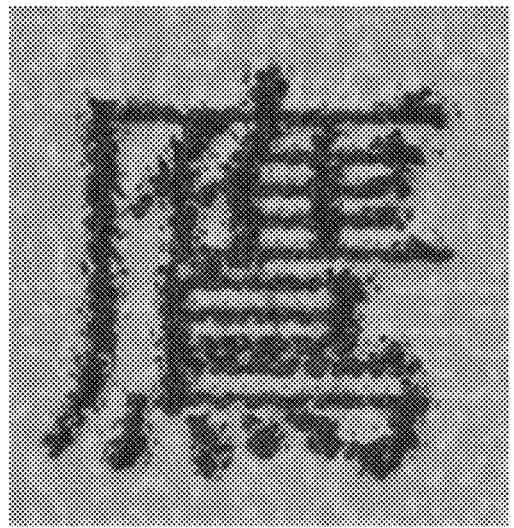
FIG. 3 shows a photograph for explaining the evaluation of bleeding in Example 3.

Printing was carried out in the same manner as in Example 1 as shown in Table 5 except that calcium pantothenate (concentration in the ink-receiving solution: 0.1 mol/l) was used as a metal salt. The print product is shown in FIG. 3. The bleeding of the obtained print product was evaluated.

Example 4

Figure 4:
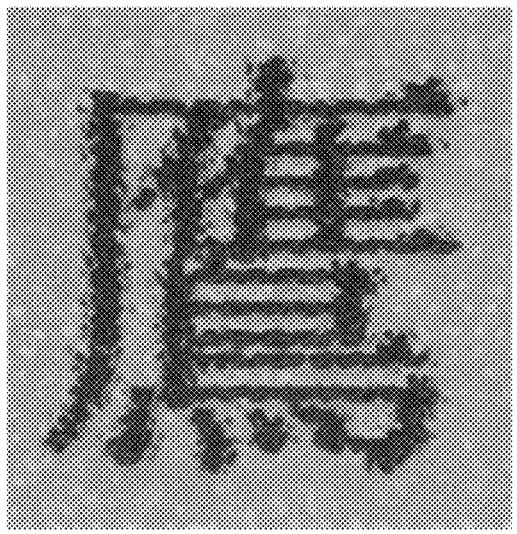
FIG. 4 shows a photograph for explaining the evaluation of bleeding in Example 4.

Printing was carried out in the same manner as in Example 1 as shown in Table 5 except that calcium pantothenate (concentration in the ink-receiving solution: 0.1 mol/l) was used as a metal salt and polyvinyl alcohol was used as a resin. The print product is shown in FIG. 4. The bleeding of the obtained print product was evaluated.

Comparative Example 1

Figure 5:
FIG. 5 shows a photograph for explaining the evaluation of bleeding in Comparative Example 1.

Printing was carried out in the same manner as in Example 1 as shown in Table 5 except that no metal salt was added to the ink-receiving solution. The bleeding of the obtained print product was evaluated. The print product is shown in FIG. 5.

Comparative Example 2

Figure 6:
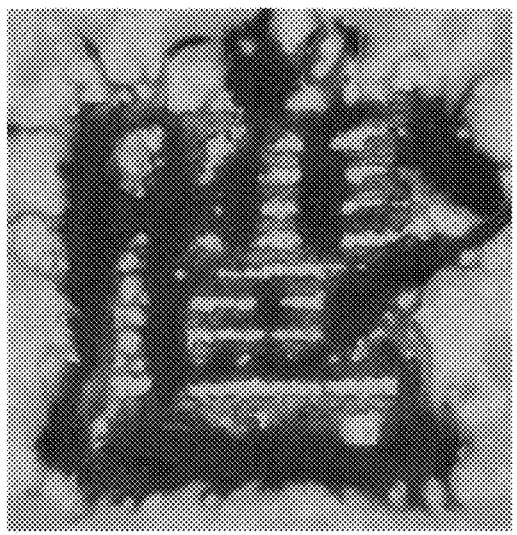
FIG. 6 shows a photograph for explaining the evaluation of bleeding in Comparative Example 2.

Printing was carried out in the same manner as in Example 2 as shown in Table 5 except that no metal salt was added to the ink-receiving solution. The bleeding of the obtained print product was evaluated. The print product is shown in FIG. 6.

Comparative Examples 3 and 4

Figure 7:
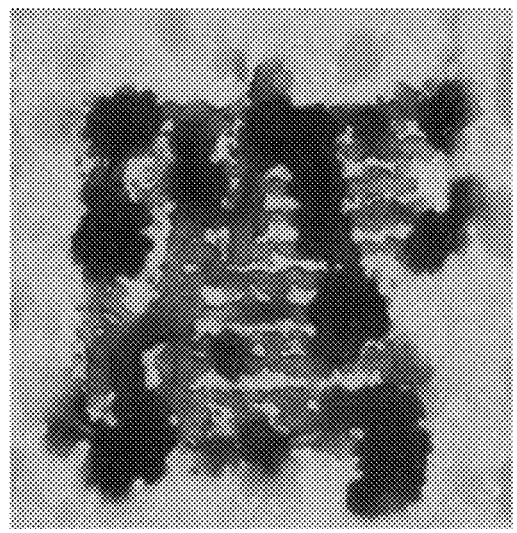
FIG. 7 shows a photograph for explaining the evaluation of bleeding in Comparative Example 3.
Figure 8:
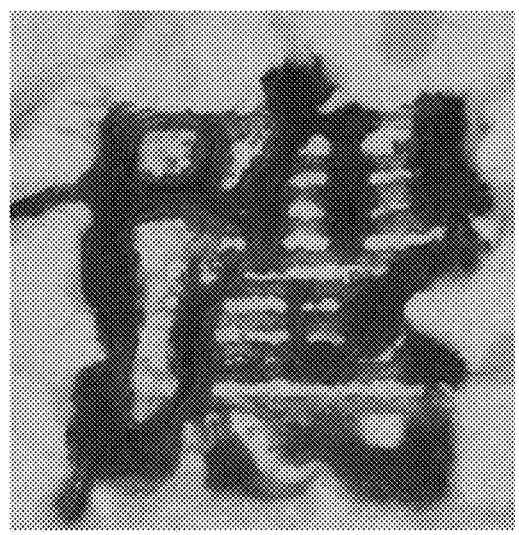
FIG. 8 shows a photograph for explaining the evaluation of bleeding in Comparative Example 4.

Printing was carried out in the same manner as in Example 1 as shown in Table 5 except that no metal salt was added to the ink-receiving solution, the pigment dispersions 2, 6, 7, and 8 were used in the inkjet ink, and gelatin and polyvinyl alcohol were used as resins for the respective ink-receiving solutions. The bleeding of each of the obtained print products was evaluated. The print products obtained in Comparative Examples 3 and 4 are shown in FIG. 7 and FIG. 8, respectively.

Comparative Examples 5 and 6

Figure 9:
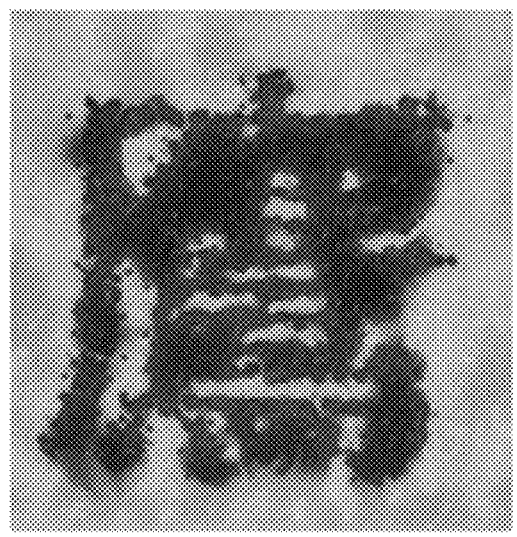
FIG. 9 shows a photograph for explaining the evaluation of bleeding in Comparative Example 5.
Figure 10:
FIG. 10 shows a photograph for explaining the evaluation of bleeding in Comparative Example 6.

Printing was carried out in the same manner as in Example 1 as shown in Table 5 except that gelatin and polyvinyl alcohol were used as resins for the respective ink-receiving solutions and the pigment dispersions 2, 6, 7, and 8 were used in the inkjet ink. The bleeding of each of the obtained print products was evaluated. The print products obtained in Comparative Examples 5 and 6 are shown in FIG. 9 and FIG. 10, respectively.

Comparative Examples 7 and 8

Figure 11:
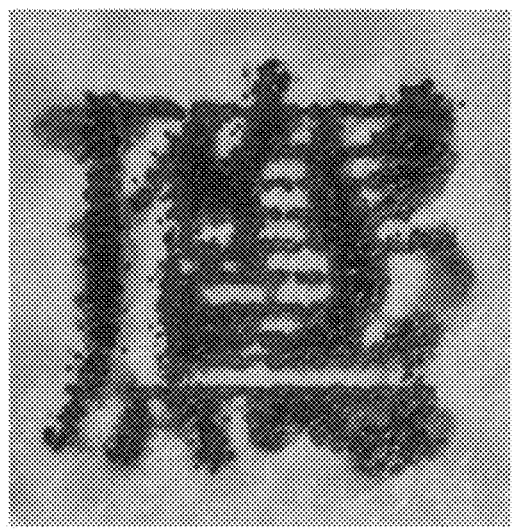
FIG. 11 shows a photograph for explaining the evaluation of bleeding in Comparative Example 7.
Figure 12:
FIG. 12 shows a photograph for explaining the evaluation of bleeding in Comparative Example 8.

Printing was carried out in the same manner as in Comparative Examples 5 and 6 as shown in Table 5 except that calcium pantothenate (concentration in the ink-receiving solution: 0.1 mol/l) was used as a metal salt. The bleeding of each of the obtained print products was evaluated. The print products obtained in Comparative Examples 7 and 8 are shown in FIG. 11 and FIG. 12, respectively.

Examples 5, 6, 7, 8 and 9

Figure 13:
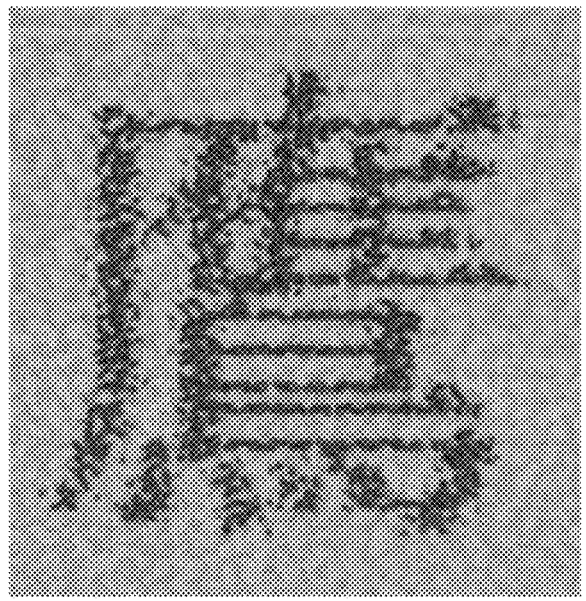
FIG. 13 shows a photograph for explaining the evaluation of bleeding in Example 7.

Printing was carried out in the same manner as in Example 1 as shown in Table 5 except that high-quality paper, polyester, vinyl chloride, cloth and metal foil coat paper were used as recording media. The bleeding of each of the obtained print products was evaluated. The print product obtained in Example 7 is shown in FIG. 13.

Comparative Examples 9, 10, 11, 12 and 13

Figure 14:
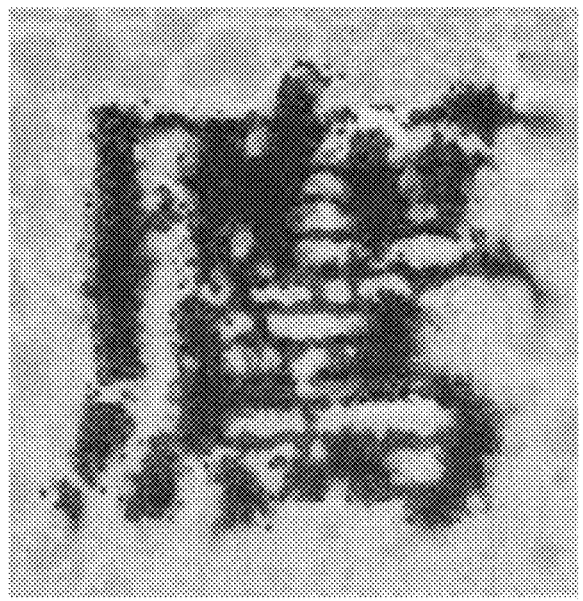
FIG. 14 shows a photograph for explaining the evaluation of bleeding in Comparative Example 11.

Printing was carried out in the same manner as in Examples 5, 6, 7, 8 and 9 as shown in Table 5 except that no metal salt was added to the ink-receiving solution. The bleeding of each of the obtained print products was evaluated. The print product obtained in Comparative Example 11 is shown in FIG. 14.

Examples 10 and 11

Printing was carried out in the same manner as in Example 1 as shown in Table 5 except that the resin concentration in the ink-receiving solution was changed to 1 mass and 20 mass %. The bleeding of each of the obtained print products was evaluated. Slight bleeding was seen in a print image portion of the print product obtained in Example 10 but not so bad for practical use.

Example 12

Printing was carried out in the same manner as in Example 1 as shown in Table 5 except that the pigment dispersions 2, 6, 7 and 8 were used in the inkjet ink and the anionic resin emulsion 1 was used in place of the anionic resin emulsion 2. The bleeding of the obtained print product was evaluated.

Example 13

Printing was carried out in the same manner as in Example 1 as shown in Table 5 except that a cationic resin emulsion was used as a resin to be added to the ink-receiving solution. The bleeding of the obtained print product was evaluated.

Example 14

Printing was carried out in the same manner as in Example 1 as shown in Table 5 except that the concentration of calcium chloride in the ink-receiving solution was changed to 0.01 mol/l. The bleeding of the obtained print product was evaluated. Slight bleeding was seen in a print image portion of the print product but not so bad for practical use.

Example 15

Printing was carried out in the same manner as in Example 1 as shown in Table 5 except that the concentration of calcium chloride in the ink-receiving solution was changed to 1.0 mol/l. The bleeding of the obtained print product was evaluated.

TABLE 5

| | recording medium | ink-receiving solution | | | inkjet ink | | | evaluation results | |
|---|---|---|---|---|---|---|---|---|---|
| | | Metal salt | concentration of metal salt | resin | concentration of resin | pigment dispersion | functional group | feathering | Fig. No. |
| Example 1 | coat paper | $CaCl_2$ | 0.1 mol/L | gelatin | 5 wt % | 1, 3, 4, 5 | phosphonic acid group | A | FIG. 1 |
| Example 2 | coat paper | $CaCl_2$ | 0.1 mol/L | PVA | 5 wt % | 1, 3, 4, 5 | phosphonic acid group | A | FIG. 2 |
| Example 3 | coat paper | calcium pantothenate | 0.1 mol/L | gelatin | 5 wt % | 1, 3, 4, 5 | phosphonic acid group | A | FIG. 3 |
| Example 4 | coat paper | calcium pantothenate | 0.1 mol/L | PVA | 5 wt % | 1, 3, 4, 5 | phosphonic acid group | A | FIG. 4 |
| Comparative Example 1 | coat paper | — | — | gelatin | 5 wt % | 1, 3, 4, 5 | phosphonic acid group | B | FIG. 5 |

TABLE 5-continued

|  | recording medium | ink-receiving solution | | | | inkjet ink | | evaluation results | |
|---|---|---|---|---|---|---|---|---|---|
|  |  | Metal salt | concentration of metal salt | resin | concentration of resin | pigment dispersion | functional group | feathering | Fig. No. |
| Comparative Example 2 | coat paper | — | — | PVA | 5 wt % | 1, 3, 4, 5 | phosphonic acid group | B | FIG. 6 |
| Comparative Example 3 | coat paper | — | — | gelatin | 5 wt % | 2, 6, 7, 8, | carboxylic acid group | B | FIG. 7 |
| Comparative Example 4 | coat paper | — | — | PVA | 5 wt % | 2, 6, 7, 8, | carboxylic acid group | B | FIG. 8 |
| Comparative Example 5 | coat paper | CaCl$_2$ | 0.1 mol/L | gelatin | 5 wt % | 2, 6, 7, 8, | carboxylic acid group | B | FIG. 9 |
| Comparative Example 6 | coat paper | CaCl$_2$ | 0.1 mol/L | PVA | 5 wt % | 2, 6, 7, 8, | carboxylic acid group | B | FIG. 10 |
| Comparative Example 7 | coat paper | calcium pantothenate | 0.1 mol/L | gelatin | 5 wt % | 2, 6, 7, 8, | carboxylic acid group | B | FIG. 11 |
| Comparative Example 8 | coat paper | calcium pantothenate | 0.1 mol/L | PVA | 5 wt % | 2, 6, 7, 8, | carboxylic acid group | B | FIG. 12 |
| Example 5 | high-quality paper | CaCl$_2$ | 0.1 mol/L | gelatin | 5 wt % | 1, 3, 4, 5 | phosphonic acid group | A | — |
| Example 6 | PET | CaCl$_2$ | 0.1 mol/L | gelatin | 5 wt % | 1, 3, 4, 5 | phosphonic acid group | A | — |
| Example 7 | polyvinyl chloride | CaCl$_2$ | 0.1 mol/L | gelatin | 5 wt % | 1, 3, 4, 5 | phosphonic acid group | A | FIG. 13 |
| Example 8 | cloth | CaCl$_2$ | 0.1 mol/L | gelatin | 5 wt % | 1, 3, 4, 5 | phosphonic acid group | A | — |
| Example 9 | metal foil | CaCl$_2$ | 0.1 mol/L | gelatin | 5 wt % | 1, 3, 4, 5 | phosphonic acid group | A | — |
| Comparative Example 9 | high-quality paper | — | — | gelatin | 5 wt % | 1, 3, 4, 5 | phosphonic acid group | B | — |
| Comparative Example 10 | PET | — | — | gelatin | 5 wt % | 1, 3, 4, 5 | phosphonic acid group | B | — |
| Comparative Example 11 | polyvinyl chloride | — | — | gelatin | 5 wt % | 1, 3, 4, 5 | phosphonic acid group | B | FIG. 14 |
| Comparative Example 12 | cloth | — | — | gelatin | 5 wt % | 1, 3, 4, 5 | phosphonic acid group | B | — |
| Comparative Example 13 | metal foil | — | — | gelatin | 5 wt % | 1, 3, 4, 5 | phosphonic acid group | B | — |
| Example 10 | coat paper | CaCl$_2$ | 0.1 mol/L | gelatin | 1 wt % | 1, 3, 4, 5 | phosphonic acid group | A | — |
| Example 11 | coat paper | CaCl$_2$ | 0.1 mol/L | gelatin | 20 wt % | 1, 3, 4, 5 | phosphonic acid group | A | — |
| Example 12 | coat paper | CaCl$_2$ | 0.1 mol/L | gelatin | 5 wt % | 2, 6, 7, 8, | phosphonic acid group *[1] | A | — |
| Example 13 | coat paper | CaCl$_2$ | 0.1 mol/L | emulsion*[2] | 5 wt % | 1, 3, 4, 5 | phosphonic acid group | A | — |
| Example 14 | coat paper | CaCl$_2$ | 0.01 mol/L | gelatin | 5 wt % | 1, 3, 4, 6 | phosphonic acid group | A | — |
| Example 15 | coat paper | CaCl$_2$ | 1.0 mol/L | gelatin | 5 wt % | 1, 3, 4, 6 | phosphonic acid group | A | — |

*[1] The anionic resin emulsion contains a phosphonic acid group.
*[2] cationic resin emulsion It was confirmed from the above results that bleeding caused by feathering and color bleeding is suppressed by carrying out printing on a recording medium to which the ink-receiving solution containing a specific metal salt and a resin of the present invention has been applied by using an inkjet ink containing a specific pigment or a resin, thereby making it possible to obtain a clear image.

The invention claimed is:

1. An inkjet recording method, comprising the steps of:
applying an ink-receiving solution (A) prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.005 to 2.0 mol/l and the concentration of the resin (B) becomes 0.5 to 20 mass % to at least a part to be printed by using an inkjet ink (I) or the entire printing surface of a recording medium (R); and
printing on the part to which the ink-receiving solution (A) has been applied by using the inkjet ink (I) comprising at least a pigment (P), an anionic resin emulsion (E), a surfactant and an aqueous solvent, wherein a phosphorus-containing group having at least one P—O or P=O bond is bound to the surface of the pigment (P) and/or the surface of the anionic resin emulsion (E).

2. The inkjet recording method according to claim 1, wherein the metal salt (S) is at least one selected from inorganic metal salts (S1) and organic acid metal salts (S2), both the inorganic metal salts (S1) and the organic acid metal salts (S2) include calcium, magnesium, nickel, aluminum, boron and zinc.

3. The inkjet recording method according to claim 1, wherein the metal salt (S) is at least one inorganic metal salt (S1) selected from chlorides and nitrates of calcium, magnesium, nickel, aluminum, boron and zinc.

4. The inkjet recording method according to claim 1, wherein the metal salt (S) is at least one organic acid metal salt (S2) selected from calcium salts, magnesium salts, nickel salt and zinc salts of pantothenic acid, propionic acid, ascorbic acid, acetic acid and lactic acid.

5. The inkjet recording method according to claim 1, wherein the water solubility of the metal salt (S) is 0.1 mol/l or more.

6. The inkjet recording method according to claim 1, wherein the hydrophilic group of the resin (B1) is at least one selected from hydroxyl group, carboxyl group, carbonyl group, ester group and amino group.

7. The inkjet recording method according to claim 1, wherein the resin (B1) is at least one selected from polypeptide, gelatin, polyvinyl alcohol-based resin, polyvinyl pyrrolidone-based resin, cellulose-based resin, poly(meth)acrylic acid, poly(meth)acrylic acid ester, rhodine-based resin, maleic acid resin and urea resin.

8. The inkjet recording method according to claim 1, wherein the amount of the ink-receiving solution (A) applied to the recording medium (R) is 20 to 2000 μmol/cm$^2$ in terms of the metal salt (S).

9. The inkjet recording method according to claim 1, wherein the ink-receiving solution (A) is applied to the recording medium (R) by at least one method selected from spray, coating, inkjet, gravure and flexographic methods.

10. The inkjet recording method according to claim 1, wherein the surface of the recording medium (R) is made of an absorbing material (R1) or a non-absorbing material (R2).

11. The inkjet recording method according to claim 10, wherein the absorbing material (R1) is groundwood paper, middle-quality paper, high-quality paper, uncoated paper, coat paper, cloth or art paper.

12. The inkjet recording method according to claim 10, wherein the non-absorbing material (R2) is a polyester-based resin, polypropylene-based synthetic paper, vinyl chloride resin, polyimide resin, metal or metal foil coat paper.

13. The inkjet recording method according to claim 1, wherein the phosphorus-containing group is at least one selected from phosphonic acid group, phosphinic acid group, phosphinous acid group, phosphite group, phosphate group, diphosphate group, triphosphate group, pyrophosphate group, and partial esters and salts thereof.

14. The inkjet recording method according to claim 1, wherein the phosphorus-containing group has a larger calcium index than the calcium index of 1,2,3-benzenetricarboxylic acid.

15. The inkjet recording method according to claim 1, wherein the conductance of an aqueous solution containing 1 mass % of a solid content of the anionic resin emulsion (E) is 300 μS/cm or less.

16. The inkjet recording method according to claim 1, wherein the average particle diameter of the anionic resin emulsion (E) is 500 nm or less.

17. The inkjet recording method according to claim 1, wherein the inkjet ink (I) contains 0.05 to 20 mass % of the anionic resin emulsion (E) as a solid content.

18. The inkjet recording method according to claim 1, wherein the inkjet ink (I) contains 0.05 to 20 mass % of the pigment (P) and 0.05 to 20 mass % of the anionic resin emulsion (E) as a solid content, and has a total solid content of the pigment (P) and the anionic resin emulsion (E) of 0.1 to 30 mass %.

19. An inkjet recording method, comprising the steps of:
applying an ink-receiving solution (A) prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.05 to 2.0 mol/l and the concentration of the resin (B) becomes 0.5 to 20 mass % to at least a part to be printed by using an inkjet ink (I) or the entire printing surface of a recording medium (R); and
printing on the part to which the ink-receiving solution (A) has been applied by using the inkjet ink (I) comprising at least a pigment (P), an anionic resin emulsion (E), a surfactant and an aqueous solvent, wherein a phosphorus-containing group having at least one P—O or P═O bond is bound to the surface of the pigment (P) and/or the surface of the anionic resin emulsion (E).

20. An ink set for inkjet recording including an ink-receiving solution (A) and an inkjet ink (I), wherein
the ink-receiving solution (A) is prepared by dissolving (inclusive of dispersing) at least one metal salt (S) selected from calcium salts, magnesium salts, nickel salts, aluminum salts, boron salts and zinc salts having a valence of 2 or more and a resin (B) comprising a resin having at least one hydrophilic group (B1) and/or a cationic or nonionic resin emulsion (B2) in an aqueous solvent to ensure that the concentration of the metal salt (S) becomes 0.005 to 2.0 mol/l and the concentration of the resin (B) becomes 0.5 to 20 mass %, and the inkjet ink (I) contains at least a pigment (P), an anionic resin emulsion (E), a surfactant and an aqueous solvent, wherein a phosphorus-containing group having at least one P—O or P═O bond is bound to the surface of the pigment (P) and/or the surface of the anionic resin emulsion (E).

* * * * *